US012682549B2

(12) United States Patent
Wang et al.

(10) Patent No.: US 12,682,549 B2
(45) Date of Patent: Jul. 14, 2026

(54) CHARACTERISTIC-BASED ACCELERATION FOR EFFICIENT SCENE RENDERING

(71) Applicant: NVIDIA Corporation, Santa Clara, CA (US)

(72) Inventors: Zian Wang, Toronto (CA); Tianchang Shen, Markham (CA); Jun Gao, North York (CA); Merlin Nimier-David, Nyon (CH); Thomas Müller-Höhne, Baar (CH); Alexander Keller, Berlin (DE); Sanja Fidler, Toronto (CA); Zan Gojcic, Uitikon Waldegg (CH); Nicholas Mark Worth Sharp, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 149 days.

(21) Appl. No.: 18/630,480

(22) Filed: Apr. 9, 2024

(65) Prior Publication Data

US 2025/0095275 A1 Mar. 20, 2025

Related U.S. Application Data

(60) Provisional application No. 63/583,415, filed on Sep. 18, 2023.

(51) Int. Cl.
*G06T 15/06* (2011.01)
*G06V 10/44* (2022.01)

(52) U.S. Cl.
CPC .............. *G06T 15/06* (2013.01); *G06V 10/44* (2022.01)

(58) Field of Classification Search
CPC ..................... G06T 15/06; G06T 15/08; G06T 2207/20084; G06T 2207/20081; G06T 17/00; G06T 2200/08; G06V 10/44; G06V 10/806; G06F 17/10
See application file for complete search history.

(56) References Cited

U.S. PATENT DOCUMENTS

| | | | |
|---|---|---|---|
| 11,657,532 B2 | 5/2023 | Park et al. | |
| 2019/0147600 A1* | 5/2019 | Karasev | G06V 10/764 |
| | | | 382/107 |
| 2021/0279942 A1* | 9/2021 | Petkov | G06T 15/80 |
| 2021/0295590 A1* | 9/2021 | DeCell | G06T 15/06 |
| 2022/0366636 A1* | 11/2022 | Lasram | G06V 10/803 |

(Continued)

*Primary Examiner* — Hau H Nguyen

(74) *Attorney, Agent, or Firm* — IRON SUMMIT IP LLP

(57) ABSTRACT

In various examples, images (e.g., novel views) of an object may be rendered using an optimized number of samples of a 3D representation of the object. The optimized number of the samples may be determined based at least on casting rays into a scene that includes the 3D representation of the object and/or an acceleration data structure corresponding to the object. The acceleration data structure may include features corresponding to characteristics of the object, and the features may be indicative of the number of samples to be obtained from various portions of the 3D representation of the object to render the images. In some examples, the 3D representation may be a neural radiance field that includes, as a neural output, a spatially varying kernel size predicting the characteristics of the object, and the features of the acceleration data structure may be related to the spatially varying kernel size.

20 Claims, 18 Drawing Sheets

(56)          References Cited

U.S. PATENT DOCUMENTS

| | | | |
|---|---|---|---|
| 2023/0052645 | A1 | 2/2023 | Keller et al. |
| 2023/0137403 | A1 | 5/2023 | Gallo et al. |
| 2023/0274492 | A1 | 8/2023 | Chen et al. |
| 2023/0298243 | A1 | 9/2023 | Nagano et al. |

* cited by examiner

FIGURE 4A

FIRST PORTION
402

RAY
408(1)

SAMPLE(S)
406

INNER SURFACE(S)
116

OUTER SURFACE(S)
118

SECOND PORTION
404

RAY
408(2)

SAMPLE
406

OUTER SURFACE(S)
118

INNER SURFACE(S)
116

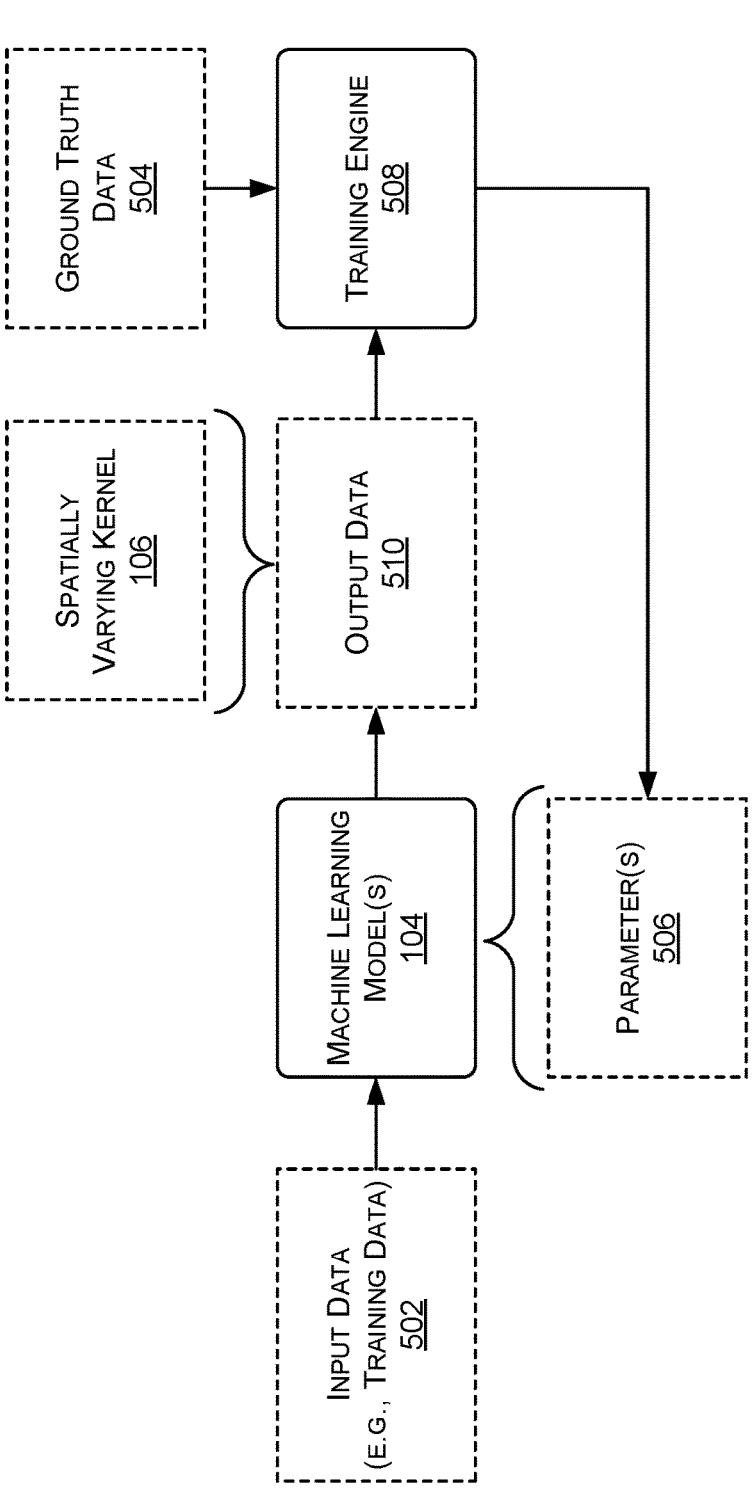
FIGURE 5

600

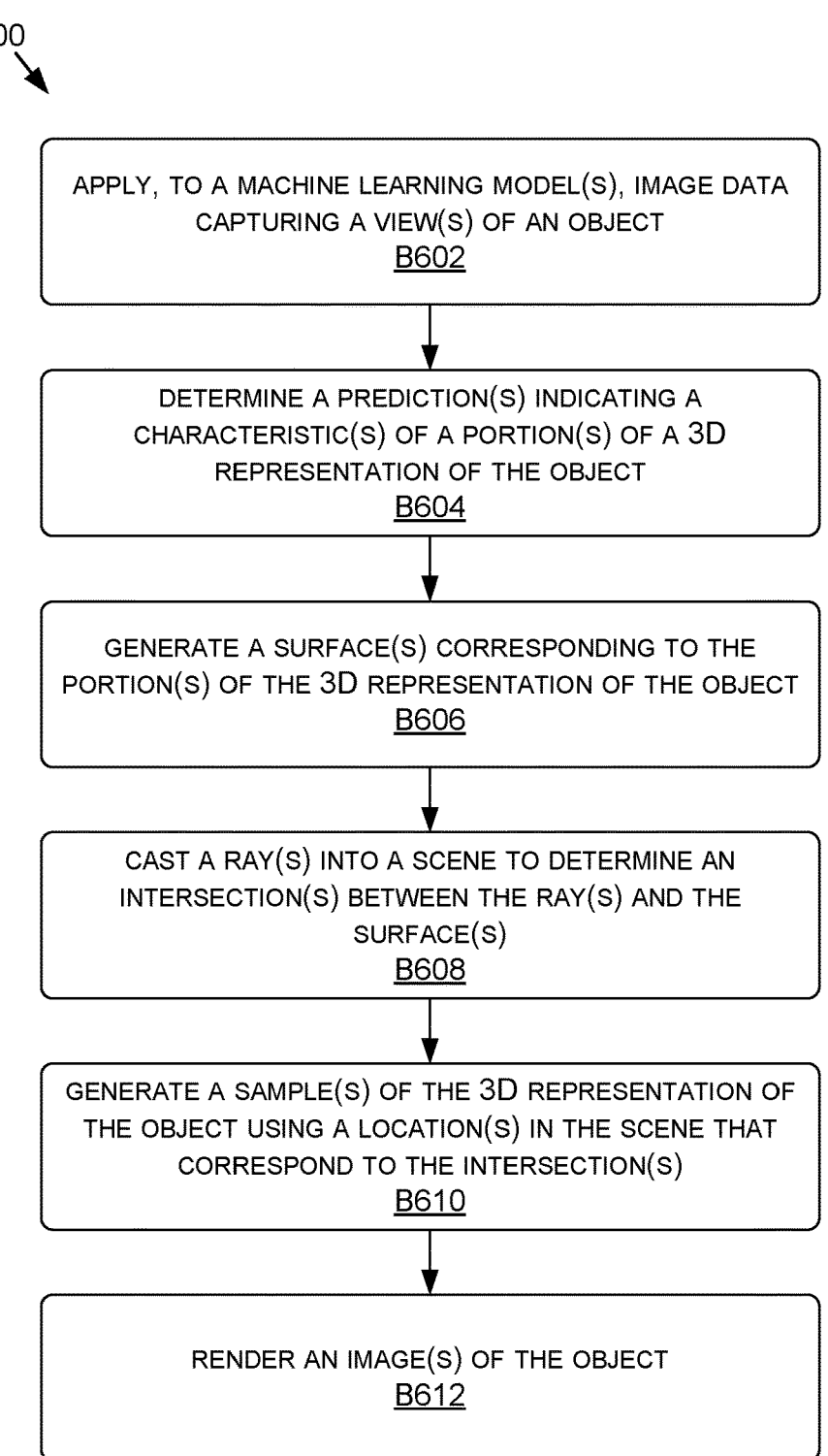

APPLY, TO A MACHINE LEARNING MODEL(S), IMAGE DATA
CAPTURING A VIEW(S) OF AN OBJECT
B602

DETERMINE A PREDICTION(S) INDICATING A
CHARACTERISTIC(S) OF A PORTION(S) OF A 3D
REPRESENTATION OF THE OBJECT
B604

GENERATE A SURFACE(S) CORRESPONDING TO THE
PORTION(S) OF THE 3D REPRESENTATION OF THE OBJECT
B606

CAST A RAY(S) INTO A SCENE TO DETERMINE AN
INTERSECTION(S) BETWEEN THE RAY(S) AND THE
SURFACE(S)
B608

GENERATE A SAMPLE(S) OF THE 3D REPRESENTATION OF
THE OBJECT USING A LOCATION(S) IN THE SCENE THAT
CORRESPOND TO THE INTERSECTION(S)
B610

RENDER AN IMAGE(S) OF THE OBJECT
B612

RAY GENERATION
1002

ACCELERATION
STRUCTURE
TRAVERSAL
1020

ANY HIT
1004

INTERSECTION
1006

No     HIT?     YES

MISS
1008

CLOSEST HIT
1010

1200
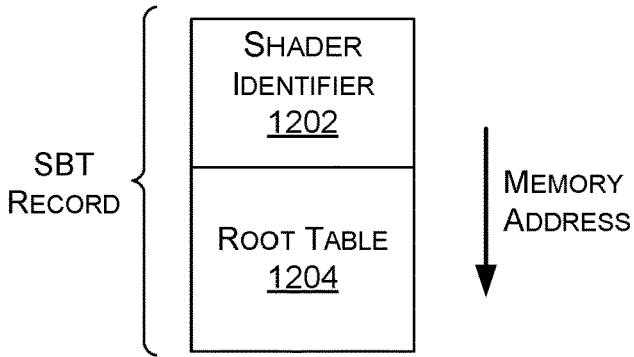
FIGURE 12

1400

CHARACTERISTIC-BASED ACCELERATION FOR EFFICIENT SCENE RENDERING

CROSS-REFERENCE TO RELATED APPLICATIONS

This application claims the benefit of U.S. Provisional Application No. 63/583,415, filed on Sep. 18, 2023, which is hereby incorporated by reference in its entirety.

BACKGROUND

Novel view synthesis may enable applications, such as virtual reality, augmented reality, three-dimensional (3D) content creation, visual effects, and/or the like to generate images-sometimes referred to as "novel views"—of a scene from viewpoints that may have not originally been captured by cameras and/or other imaging devices. In other words, novel view synthesis may involve creating new perspectives or viewpoints of a scene that were not part of the original set of images or frames. One goal of novel view synthesis may be to produce images that realistically depict the scene from arbitrary viewpoints, taking into account various factors such as scene geometry, lighting conditions, texture, and/or appearance variations. This process may often involve combining information from multiple input images or frames to generate coherent and/or visually convincing new views.

Traditional methods for novel view synthesis may typically rely on geometric techniques, such as multi-view stereo and/or structure-from-motion, which may estimate the 3D geometry of the scene from multiple images and then use geometric transformations to render novel views. While mesh-based and/or other traditional techniques have been widely used for novel view synthesis, they often struggle with handling complex scenes that include fine details, occlusions, and/or irregular geometry, as well as with preserving texture details and producing realistic shading and/or lighting effects.

In recent years, deep learning techniques—in particular, neural networks—have begun to gain popularity for their performance in novel view synthesis. For example, Neural Radiance Fields (NeRFs) have emerged as a prevalent method for generating 3D representations of scenes, enabling realistic novel view synthesis and scene reconstruction. NeRFs may model a scene as a continuous volumetric function, where the radiance (color and intensity) at any point in the scene can be computed by querying this function. By training neural networks to represent this volumetric function, NeRFs may generate high-quality novel views with realistic lighting and appearance variations.

In contrast to traditional techniques, NeRFs may be able to handle complex scenes with intricate details and/or challenging lighting conditions more effectively. Since NeRFs may learn to model the scene's appearance directly from the input images, NeRFs may have the ability to capture-fine-grained details and subtle variations accurately. Moreover, because NeRFs may represent the scene as a continuous function rather than discrete geometry, NeRFs may inherently be able to address occlusions and/or thin structures better than traditional techniques.

However, despite some of these advantages, NeRF representations may frequently involve higher computational costs and/or may involve longer rendering times than may typically be associated with traditional methods. These inefficiencies may hinder and/or prevent the use of NeRFs in certain situations, such as augmented, mixed, or virtual reality applications, and/or other domains. Additionally, while some efforts have been made to improve the efficiencies of NeRF-based renderings, the attempts to speed up NeRF-based renderings has generally resulted in compromising the perceptual quality and/or level of detail typically expected from NeRF renderings.

SUMMARY

Embodiments of the present disclosure relate to characteristic-based acceleration for efficient scene rendering. Systems and methods are disclosed that, among other things, may improve the efficiency of novel-view synthesis while maintaining or even improving the visual quality of rendered images.

In contrast to conventional systems, such as those described above, the current systems, in some embodiments, are able to decrease the amount of time and/or computational costs that may traditionally be associated with NeRF representations by optimizing the number of samples (e.g., neural network evaluations) needed per pixel for a rendering. As described herein, the current systems may use one or more machine learning models to generate a scene including a 3D representation of an object. For instance, the machine-learning model(s) may include one or more neural networks (e.g., deep learning neural networks) used to represent the scene as a volumetric NeRF. In some examples, the machine learning model(s) may determine one or more prediction(s) associated with one or more characteristics of the object in the 3D representation. For instance, the NeRF used to represent the object may include, as a neural output, a spatially varying kernel size indicating the predicted characteristic(s) of the object. In some examples, the system(s) may generate one or more surfaces corresponding to the 3D representation of the object. The surface(s) may be generated based at least on the prediction(s) such that one or more features of the surface(s) are indicative of the underlying characteristic(s) of the object. In some instances, the system(s) may use the surface(s) as a ray casting acceleration data structure(s) and cast one or more rays into the scene and/or against the surface(s) to determine one or more intersections between the ray(s) and the surface(s). In this way, the system(s) may generate one or more samples of the 3D representation of the object using one or more locations in the scene that correspond to the intersection(s). The system may then render, using the sample(s), one or more images (e.g., novel views) of the object.

BRIEF DESCRIPTION OF THE DRAWINGS

The present systems and methods for characteristic-based acceleration for efficient scene rendering are described in detail below with reference to the attached drawing figures, wherein:

FIG. 4A illustrates one or more example surfaces associated with the representation of the object, in accordance with some embodiments of the present disclosure;

FIG. 5 is a data flow diagram illustrating an example process for training one or more machine learning models to determine predictions about object characteristics, in accordance with some embodiments of the present disclosure;

FIG. 6 is a flow diagram illustrating an example method for rendering a scene, in accordance with some embodiments of the present disclosure;

FIG. 9C illustrates an example system in which the various architecture and/or functionality of the various embodiments may be implemented;

FIG. 12 illustrates an example shader record suitable for use in implementing at least some embodiments of the present disclosure;

DETAILED DESCRIPTION

Figure 1:
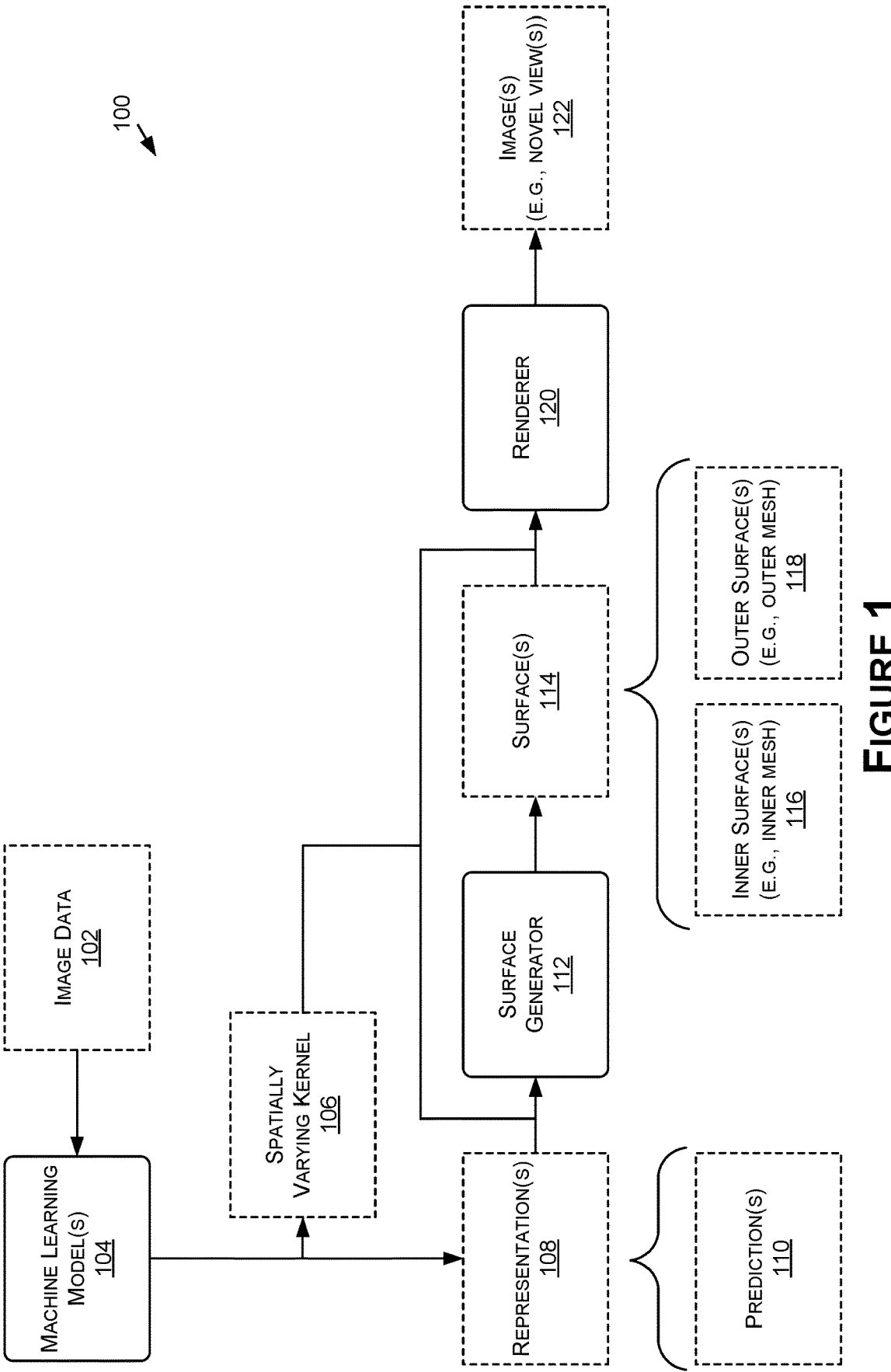
FIG. 1 is a data flow diagram illustrating an example process for rendering a scene, in accordance with some embodiments of the present disclosure.

Systems and methods are disclosed related to characteristic-based acceleration for efficient scene rendering. For instance, a system(s) may apply image data capturing one or more views of an object (e.g., one or more objects, a scene including one or more objects, etc.) to one or more machine learning models (MLMs). In some examples, the system(s) may use the MLM(s) to determine one or more predictions associated with the object in the image data. The prediction(s) may include predictions about one or more characteristics associated with one or more portions the object, such as whether a portion of the object is geometrically complex, volumetrically complex, etc. For example, consider a scenario in which the object to be rendered is a face and/or head of a person (e.g., a human being). Such person's face/head may include one or more opaque (e.g., solid, smooth, sharp, dense, nontransparent, etc.) surfaces/features, such as the person's skin, nose, cheeks, forehead, etc., as well as one or more volumetric (e.g., complex, spatial, low-density, blurry, transparent, semi-transparent, etc.) surfaces, including, but not limited to, the person's hair, eyebrows, eyelashes, facial hair, etc. Accordingly, in some examples the prediction(s) may include predictions about which portion(s) of the person's face/head correspond to the opaque surfaces and/or the volumetric surfaces, predictions relating to magnitudes, measurements, and/or values associated with the opaque/volumetric surfaces themselves (e.g., a measure of how opaque or volumetric the surface is on a sliding scale from 1 to 100, etc.), and/or any other prediction(s) about a surface that may be determined by and/or using an MLM.

Additionally, in some examples, the system(s) may use the MLM(s) to generate a 3D representation of the object. That is, in some examples, the MLM(s) may generate data indicating the 3D representation of the object. For example, in some instances the MLM(s) may include one or more neural radiance field (NeRF) networks that represent the object/image as a volumetric radiance field. In some examples, the 3D representation of the object generated using the MLM(s) may indicate the prediction(s) associated with the portion(s) of the object. Continuing with the example from above, the system(s) may predict the 3D representation of the person's face/head in a way that indicates (e.g., visually, algorithmically, mathematically, etc.) which portion(s) of the person's face/head correspond to which characteristic(s) (e.g., opaque surfaces, volumetric surfaces, etc.). One or more of the predictions may relate to the measure of how opaque or volumetric the surface is on the sliding scale, and/or any other predictions.

In some examples, the prediction(s) determined/generated using the MLM(s) may correspond to a kernel that indicates the characteristic(s) associated with the object by controlling a sharpness of an implied density in a volumetric radiance field. In some examples, a size of the kernel may be spatially varying and automatically adapt to the sharpness of scene content. For example, the size of the kernel may converge to a large kernel size for volumetric surfaces and collapse to a small kernel size (e.g., an impulse function) for opaque surfaces. This may result in increased rendering quality across a wide variety and majority of scenes, if not all scenes. Additionally, in some examples, the spatially varying size of the kernel may be locally trained/learned based on the image data. That is, the kernel may be trained to converge to the large kernel size for the volumetric surfaces and collapse to the small kernel size for the opaque surfaces.

In some examples, the system(s) may generate or otherwise determine one or more surfaces corresponding to the portion(s) of the 3D representation of the object. The surface(s) may be generated/determined using the prediction(s) and/or based at least on the characteristic(s). In some examples, the surface(s) may be associated with one or more shells (e.g., bounding shell(s)) corresponding to the 3D representation of the object. For instance, the surface(s) may include one or more first surfaces corresponding to one or more outer surfaces of the shell(s) and one or more second surfaces corresponding to one or more inner surfaces of the shell(s). In some examples, the first surface(s) may be determined based at least on a dilation of one or more third surfaces (e.g., a level set representation) and the second surface(s) may be determined based at least on an erosion of the third surface(s).

In some examples, a thickness of the shell(s) may vary between different portions of the shell(s) based at least on the prediction(s) and/or the characteristic(s). For example, at a first portion of the shell(s) that corresponds to a first portion of the 3D representation of the object, the shell(s) may have a first thickness based at least on one or more first predictions and/or first characteristics associated with the first portion of the 3D representation. At one or more second portions of the shell(s) that corresponds to one or more second portions of the 3D representation, the shell(s) may have one or more second thicknesses based at least on one or more second predictions and/or second characteristics associated with the second portion of the 3D representation. For instance, thick portions of the shell(s) may correspond to volumetric surfaces/portions of the object and thin portions of the shell(s) may correspond to opaque surfaces/portions of the object. That is, a distance between the first surface(s) corresponding to the outer surface(s) of the shell(s) and the second surface(s) corresponding to the inner surface(s) of the shell(s) may be different at different portions of the surface(s) based at least on a relationship between the thickness and the prediction(s)/characteristic(s) associated with the object.

In some examples, the surface(s) and/or the shell(s) may include and/or be represented using one or more mesh structures (e.g., triangle meshes). For instance, the first surface(s) may be represented using one or more first meshes and the second surface(s) may be represented using one or more second meshes. That is, the surface(s) and/or the shell(s) may be represented by a mesh envelope including the mesh structure(s), which may spatially bound a neural volumetric representation (e.g., the 3D representation) of the object. In this way, mesh reconstruction and/or explicit surface geometry techniques can be combined with NeRFs to accelerate NeRF renderings.

In some examples, the system(s) may use the surface(s) for ray tracing acceleration. For instance, the system(s) may cast one or more rays into a scene and/or against the surface(s) to determine one or more intersections between the ray(s) and the surface(s). By casting the ray(s) against the surface(s), the system(s) may be able to skip empty space in the scene and focus on obtaining samples from the 3D representation (e.g., radiance field) in portions that may contribute more significantly to the rendering. In other words, by casting the ray(s) against the surface(s), the system(s) may obtain more samples in portions that require more samples to be accurately reproduced, and obtain less samples in portions that are easier and/or may be accurately reproduced with fewer samples. Additionally, the system(s) may be able to determine a number of samples to generate along the(s) ray based at least on a thickness of the shell(s) and/or a distance between intersections, thereby reducing and/or minimizing the number of samples needed for rendering simple surfaces, while also ensuring a sufficient number of samples are obtained for complex surfaces. For example, in opaque portions corresponding to a thin shell and/or small distance between the first surface(s) and the second surface(s), the system(s) may be able to render one or more images (e.g., novel-views) of the object using a small number of samples, potentially even a single sample. In contrast, in volumetric portions corresponding to a thick shell and/or larger distance between the first surface(s) and the second surface(s), the system(s) may obtain a larger number of samples along a ray for use in rendering the image(s) of the object.

In some examples, the system(s) may generate or otherwise obtain one or more samples of the 3D representation of the object using one or more locations in the scene that correspond to the one or more intersections. In some examples, the location(s) may correspond to one or more points along the ray(s) that pass through the surface(s) and/or shell(s). That is, the location(s) may correspond to point(s) that are located within the shell(s) and/or disposed on one or more of the surface(s). By obtaining the sample(s) that correspond with the location(s) that need more samples to accurately reproduce, a total number of the sample(s) to be obtained in order to generate a realistic rendering(s) of the object may be reduced. In some cases, the total number of the sample(s) to be obtained may be reduced by hundreds and/or even thousands of samples, which can significantly reduce the amount of time and/or computational resources needed generate the rendering of the object.

Turning now with reference to FIG. 1, FIG. 1 is a data flow diagram illustrating an example process 100 for rendering a scene, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 illustrated in FIG. 1 includes applying image data 102 to one or more machine learning models 104. The machine learning model(s) 104 may generate and/or output a spatially varying kernel 106 and/or one or more representations 108 associated with, for example, one or more objects represented in the image data 102. The representation(s) 108 may include and/or indicate one or more predictions 110 associated with the object(s). The process 100 may also include a surface generator 112 configured to generate or otherwise determine one or more surfaces 114 corresponding to the object(s) in the representation(s) 108. The surface(s) 114 may include one or more inner surfaces 116 and one or more outer surfaces 118. The process 100 may also include a renderer 120 that generates one or more images 122 (e.g., one or more novel views) of the object using the representation(s) 108 and the surface(s) 114.

Figure 2:
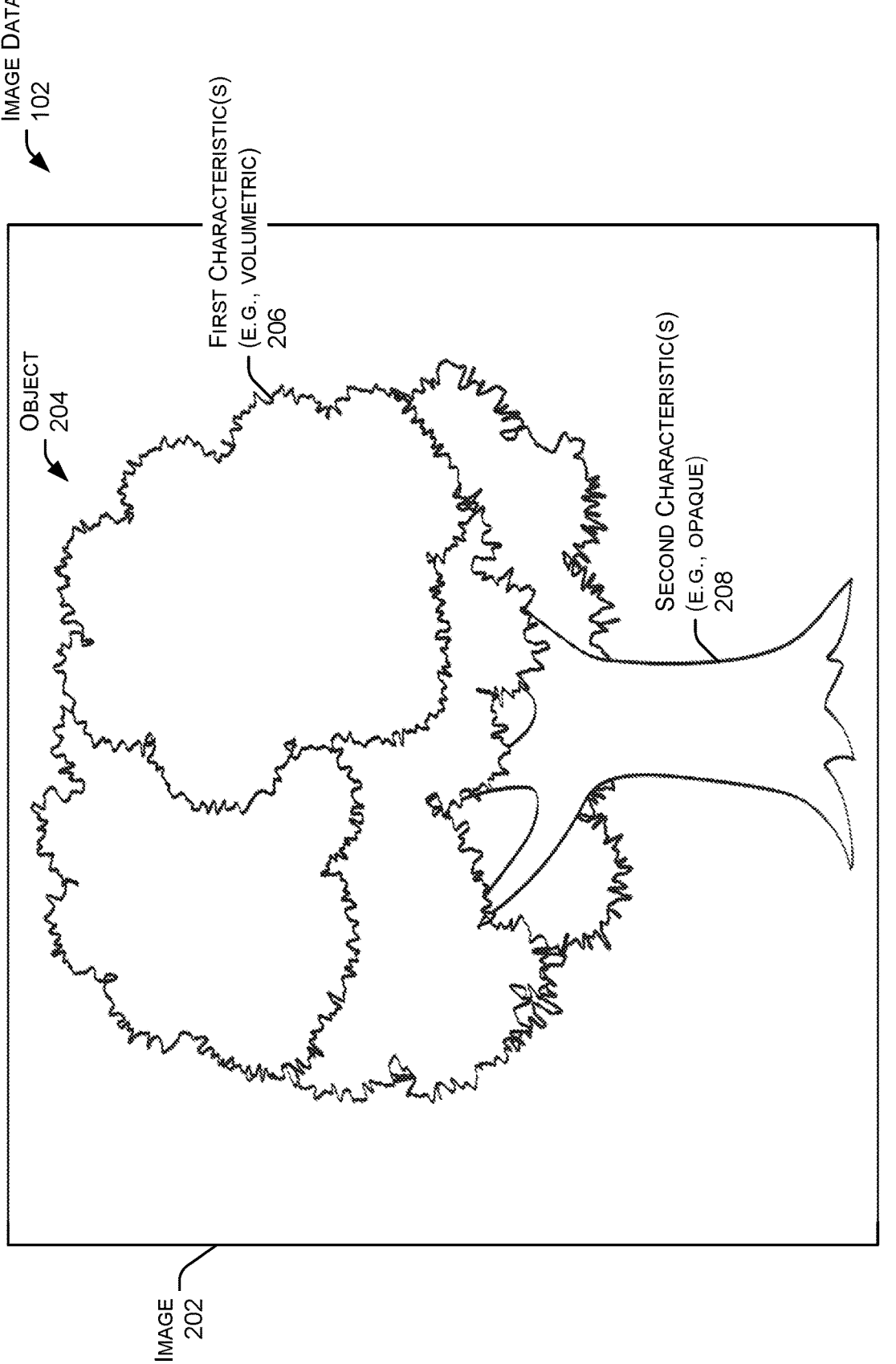
FIG. 2 illustrates an example image of an object that may be included in image data, in accordance with some embodiments of the present disclosure.

In some examples, the image data 102 may include one or more images representing one or more views of the object(s). For example, FIG. 2 illustrates an example image 202 of an object 204 that may be included in the image data 102, in accordance with some embodiments of the present disclosure. As shown, the object 204 may represent a tree that includes one or more first characteristics 206 and one or more second characteristics 208, which may be different from the first characteristic(s) 206. For instance, the first characteristic(s) 206 may correspond to one or more volumetric portions of the object 204, such as leaves, branches, needles, etc. of the tree. The second characteristic(s) 208 may correspond to one or more opaque portions of the object 204, such as the trunk, bark, etc. of the tree. In some examples, the object 204 may include any number of characteristics (e.g., third characteristics, fourth characteristics, etc.). It should also be appreciated that the object 204 is described herein as having different characteristics (e.g., first characteristics, second characteristics, etc.) for simplicity and ease of understanding, however, the properties/features of the object 204 may be indicated by one or more values indicating, for instance, a score representing how volumetric and/or opaque different portions of the object are.

With reference back to FIG. 1, in some examples, the machine learning model(s) 104 may represent or otherwise include one or more Neural Radiance Field (NeRF) networks configured to represent a scene as a volumetric radiance field that maps a 3D point ($x \in \mathbb{R}^3$) and a viewing direction ($d \in \mathbb{R}^3$) to a volume density ($\sigma$) and an emitted view-dependent color ($c \in \mathbb{R}^3$), respectively. In some examples, the volumetric radiance field determined by the machine learning model(s) 104 may be represented by one or more neural networks ($NN_\theta(\cdot)$) with parameters $\theta$, such that $(c,\sigma)=NN_\theta(x, d)$. In some examples, the machine learning model(s) 104 may render the scene along a ray ($r=o+\tau d$) with origin ($o \in \mathbb{R}^3$) and direction ($d \in \mathbb{R}^3$) from $\tau^n$ to $\tau_f$ via standard volumetric rendering:

$$c(r) = \int_{\tau_n}^{\tau_f} \exp\left[\int_{\tau_n}^{\tau} -\sigma(r(z))dz\right]\sigma(r(\tau))c(r(\tau), d)d\tau$$

which may be approximated by numerical integration:

$$c(r) = \sum_{i=1}^{N_r}\exp\left[-\sum_{j=1}^{i-1}\sigma_j\delta_j\right](1 - \exp(-\sigma_i\delta_i))c(r, d)_i$$

where $N_r$ may denote the number of samples along the ray r and $\delta_i$ may be the distance between two adjacent samples.

In some examples, the machine learning model(s) 104 may replace the learned density $\sigma$ with a learned signed distance field (f). The signed distance field may then be used to transform f to $\sigma$ for rendering via a sigmoid-shaped map, in some instances. In some examples, the machine learning model(s) 104 may optimize a signed distance function (SDF) (c, f)=$NN_\theta$ (x, d) along with a kernel size (e.g., the spatially varying kernel 106) that may control the sharpness of the implied density. To evaluate volume rendering, the SDF value f at x may be transformed to a density $\sigma$ by:

$$\sigma = \max\left(\frac{\frac{d\Phi_s}{d\tau}(f)}{\Phi_s(f)}, 0\right), \quad \Phi_s(f) = \left(1 + \exp(-f/s)\right)^{-1}$$

where f may implicitly correspond to f(r($\tau$)) along a ray. In some examples, a small s may result in a wide kernel with a fuzzy density, while in the limit $$\lim_{s\to 0} d\Phi_s / d\tau$$

may approximate a sharp impulse function. In some instances, the SDF-based formulation may allow for the use of an Eikonal regularizer during training, which may encourage the learned f to be an actual distance function, which may result in a more accurate surface reconstruction.

In some examples, a global kernel size may not adapt well to scenes that contain a mixture of opaque surfaces (e.g., furniture, cars, etc.) and volumetric surfaces (e.g., hair, grass, foliage, etc.). Accordingly, in some examples, the machine learning models 104 may be used to predict the spatially varying kernel 106. As such, outputs (e.g., the representation(s) 108 and/or the prediction(s) 110) of the machine learning model(s) 104 may include or indicate the spatially-varying, locally learned kernel size s as an additional neural output that is dependent on the input 3D position x. The extended neural network may then become (c, f, s)=$NN_\theta$ (x, d). In some examples, during training of the machine learning model(s) 104 and/or the spatially varying kernel 106, a regularizer may be used to promote smoothness of the kernel size field. In some instances, this neural field may be fit from color image supervision, and the resulting spatially-varying kernel size may automatically adapt to the sharpness (e.g., opaque/volumetric) of the scene content.

Figure 3:
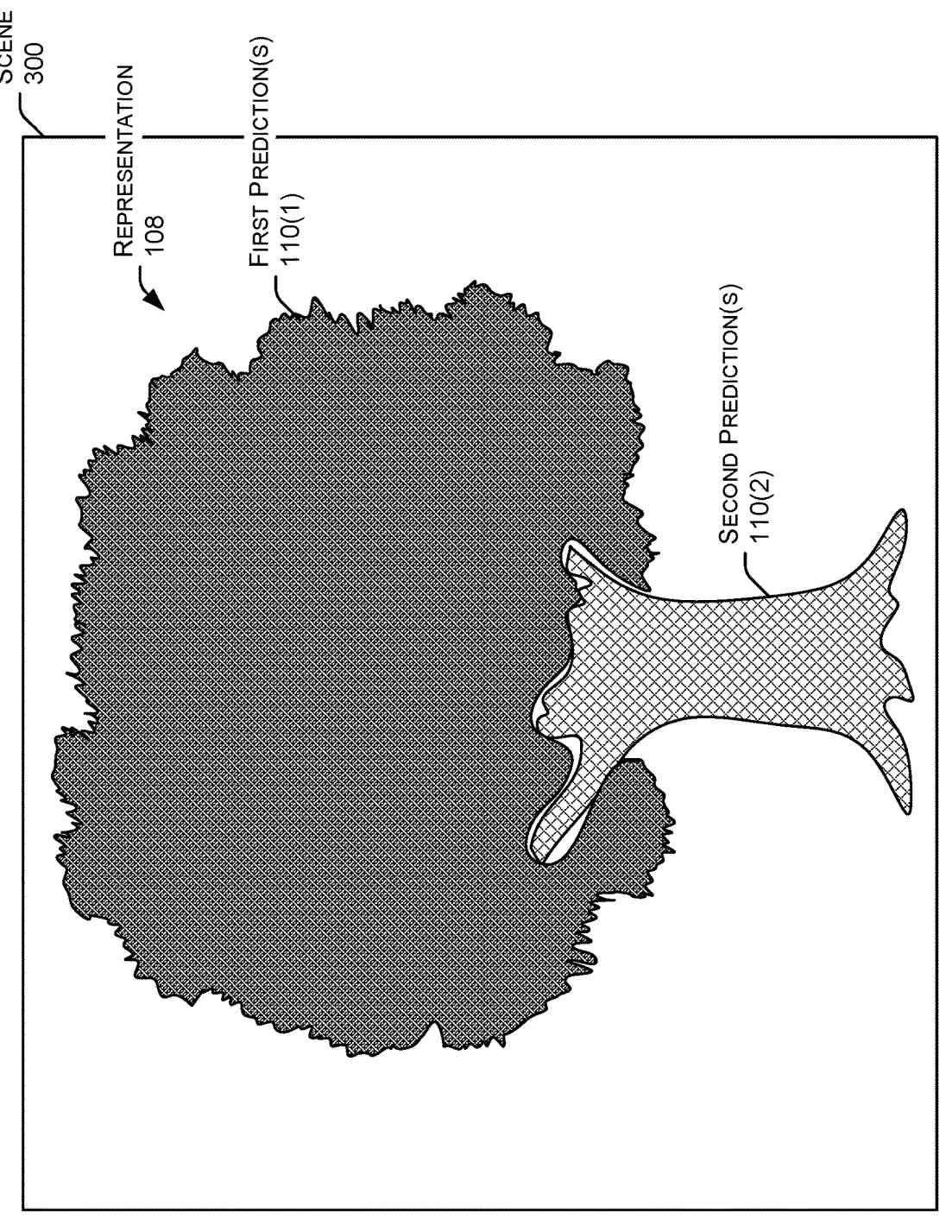
FIG. 3 illustrates an example scene including a representation of the object indicating example predictions associated with the object, in accordance with some embodiments of the present disclosure.

In some examples, the representation(s) 108 may include 3D representations corresponding to the object(s) captured in the image data 102. Additionally, the representation(s) 108 may indicate the prediction(s) 110, which may correspond to features and/or characteristics of the object(s). For example, FIG. 3 illustrates an example scene 300 including a representation 108 of the object 204 and indicating example predictions associated with the object 204, in accordance with some embodiments of the present disclosure. The representation 108 may include one or more first prediction(s) 110(1) and one or more second prediction(s) 110(2), as well as one or more other predictions (e.g., third predictions, fourth predictions, etc.) not shown. In some examples, the representation 108 may correspond to a neural output of a NeRF, and the first prediction(s) 110(1) and the second prediction(s) 110(2) may be represented using different sizes of the spatially varying kernel 106 included in the neural outputs. For instance, because the object 204 represented in the image data 102 includes the first characteristic(s) 206 and the second characteristic(s) 208, the representation 108 may include the first prediction(s) 110(1) corresponding to the first characteristic(s) 206 and the second prediction(s) 110(2) corresponding to the second characteristic(s) 208. In some examples, the first prediction(s) 110(1) may correspond to a first size of the kernel and the second prediction(s) 110(2) may correspond to one or more second sizes of the kernel which may be smaller than the first size.

With reference back to FIG. 1, in some examples, the surface generator 112 may use the spatially varying kernel 106, the representation(s) 108, and/or the prediction(s) 110 to determine the surface(s) 114. The surface(s) 114, in some examples, may include one or more inner surface(s) 116 and/or one or more outer surface(s) 118. The surface(s) 114, including the inner surface(s) 116 and/or the outer surface(s) 118, may be represented using one or more explicit meshes, such as triangle meshes. In some examples, the surface(s) 114 may correspond to one or more adaptive shells (e.g., bounding shells) that include the inner surface(s) 116 and/or the outer surface(s) 118. The surface(s) 114 may delimit one or more regions of space of the representation(s) 108 that may contribute to the rendered appearance. In some examples, the surface generator 112 may extract the surface(s) 114 (e.g., the adaptive shell) as a post-process after the implicit fields s and f have been fit by the machine learning model(s) 104.

In some examples, the surface generator 112 may compute a magnitude of the quantity f/s in the sigmoid exponent to determine the rendering contribution along a ray. In some examples, the surface generator 112 may separately extract the inner surface(s) 116 as an erosion of the f=0 level set, and the outer surface(s) 118 as a dilation of the f=0 level set. The surface generator may extract these surface(s) using a regularized, constrained level set evolution.

For example, the surface generator 112 may first sample the fields f and s at the vertices of a regular grid. The surface generator 112 may then apply a level set evolution to f, producing an eroded field (SDF_), and extract the SDF_=0 level set as an inner surface boundary via marching cubes. The surface generator 112 may perform a separate, similar evolution to determine a dilated field (SDF$_+$), and the SDF$_+$=0 level set may form the outer surface boundary. In some examples, the dilated outer surface(s) 118 may be smooth to avoid visible boundary artifacts, while the eroded inner surface(s) 116 may not be smooth, and may exclude regions which do not significantly contribute to the rendered appearance.

In some examples, a level set evolution of a field a may be given by the relationship $\partial f / \partial t = -|\nabla f| v$, where v may represent the desired scalar outward-normal velocity of the level set. A constrained, regularized flow on f may then be determined by:

$$\frac{\partial f}{\partial t} = -|\nabla f|\left(v(f_0, s) + \lambda_{curv}\nabla \cdot \frac{\nabla f}{|\nabla f|}\right)\omega(f),$$

where $f_0$ may denote the initial learned SDF, the divergence term may be a curvature smoothness regularizer with weight ($\lambda_{curv}$). In some examples, a soft falloff ($\omega$) may limit the flow to a window around the level set:

$$\omega(f) = \frac{1}{2}(1 + \cos(\pi \ clamp(f/\xi, -1., 1.))),$$

with window width ($\xi$). To dilate the level set, the surface generator 112 may determine a velocity to fill all regions with density $\sigma > \sigma_{min}$ for a ray coming in the normal direction:

$$v_{dilate}(f_0, s) = \begin{cases} \beta_d \sigma(f_0, s) & \sigma(f_0, s) > \sigma_{min} \\ 0 & \sigma(f_0, s) \le \sigma_{min} \end{cases}$$

with $\beta_d$ as a scaling coefficient. In some examples, $\xi$ may equal 0.1 and $\lambda_{curv}$ may equal 0.01 for this process, however these are just example values, and other values may additionally, or alternatively, be used. To erode the level set, the velocity may be inversely-proportional to the density, so that the shell expands inward quickly for low density (e.g., volumetric) regions and slowly for high density (e.g., opaque) regions:

$$v_{erode}(f_0, s) = \min\left(v_{max}, \beta_e \frac{1}{\sigma(f_0, s)}\right),$$

where here, $\xi$ may be equal to 0.05, and $\lambda_{curv}$ may be equal to 0, however these are just example values, and other values may additionally, or alternatively, be used. The velocities may lead to a short-distance flow and, thus, a narrow shell where s is small and the content is opaque. The velocities may lead to a long-distance flow and hence a wide shell where s is large and the content is volumetric. In other words, where s is small and the content is opaque, a distance between the inner surface(s) 116 and the outer surface(s) 118 may tend to be shorter, but where s is large and the content is volumetric, the distance between the inner surface(s) 116 and the outer surface(s) 118 may tend to be longer.

Figure 4A:
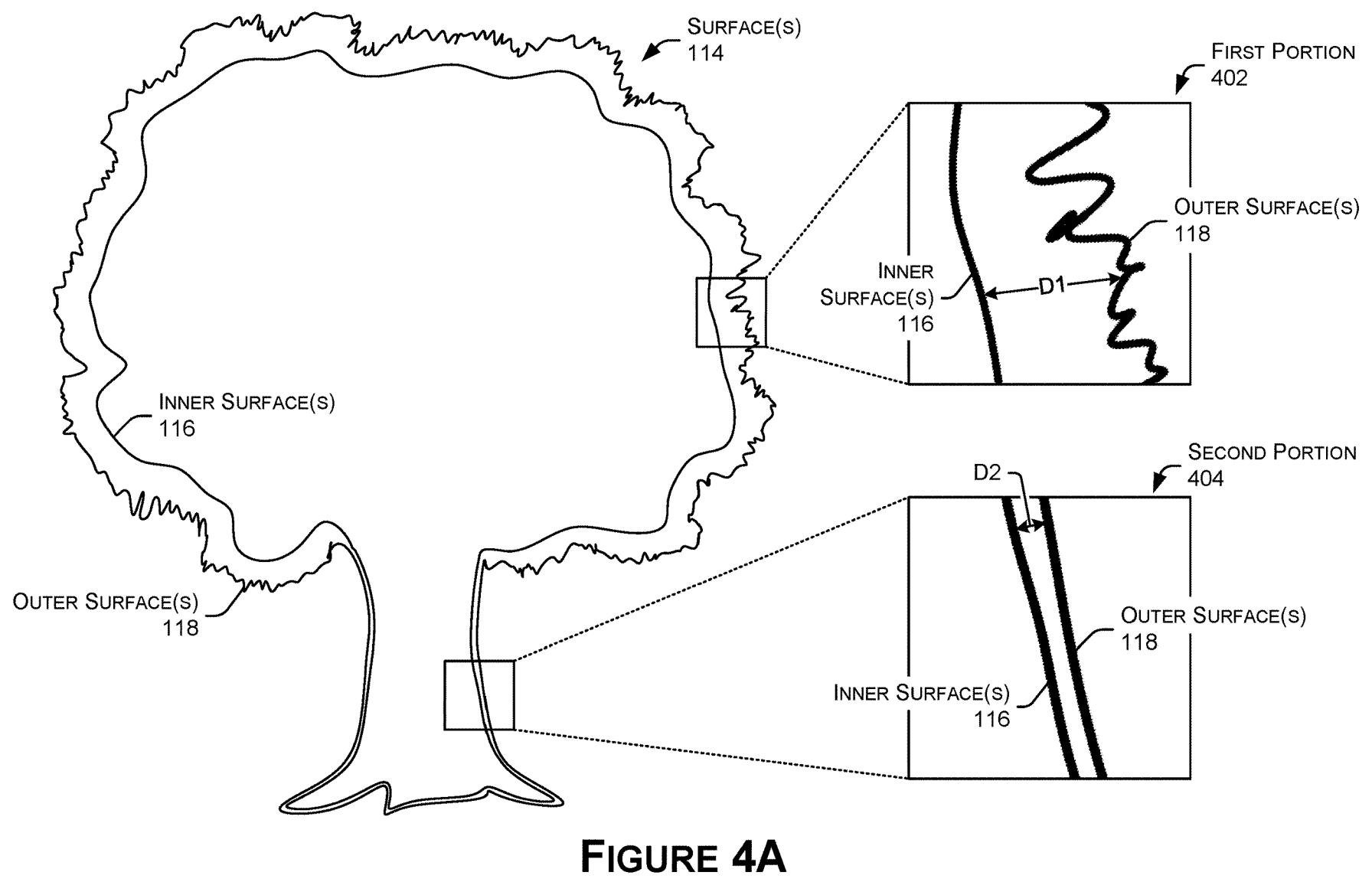

For example, FIG. 4A illustrates one or more example surfaces 114 associated with the representation 108 of the object 204, in accordance with some embodiments of the present disclosure. The surface(s) 114 illustrated in FIG. 4A includes the inner surface(s) 116 and the outer surface(s) 118. As shown, the surface(s) 114 may form a bounding shell corresponding to the object 204. Additionally, distances between the inner surface(s) 116 and the outer surface(s) 118 may vary between different portions surface(s) 114 based at least on the underlying characteristic(s) and/or the underlying prediction(s) 110 associated with the object 204. For instance, FIG. 4A illustrates example detail associated with a first portion 402 of the surface(s) 114 and a second portion 404 of the surface(s) 114. The first portion 402 may correspond to the first characteristic(s) 206 (e.g., volumetric) of the object 204 and/or the first prediction(s) 110(1), while the second portion 404 may correspond to the second characteristic(s) 208 (e.g., opaque) of the object 204 and/or the second prediction(s) 110(2). Accordingly, and as explained herein, a first distance "D1" between the inner surface(s) 116 and the outer surface(s) 118 at the first portion 402 may be greater than a second distance "D2" between the inner surface(s) 116 and the outer surface(s) 118 at the second portion 404, as shown in FIG. 4A.

With reference back to FIG. 1, the surface generator 112 may compute the dilated field SDF$_+$ (e.g., the outer surface(s) 118) and the eroded field SDF_ (e.g., the inner surface (s0 116) using a forward-Euler integration on the grid for a number (e.g., 20, 30, 40, 50, etc.) of steps of integration, and compute derivatives via spatial finite differences. In some examples, the surface generator 112 may or may not use numerical redistancing. Finally, the surface generator 112 may clamp the results SDF_←max (f$_0$, SDF_) and SDF$_+$←max (f$_0$, SDF$_+$), to ensure that the eroded field(s) only shrink the level set, and the dilated flow(s) only grows the level set. In some examples, the SDF$_+$=0 and SDF_=0 level sets may be extracted via marching cubes as the outer surface(s) 118 and inner surface(s) 116 boundary meshes M+ and M, respectively.

In some examples, the renderer 120 may use the spatially varying kernel 106, the surface(s) 114, and/or the representation(s) 108 to render one or more images 122 (e.g., novel views) associated with the object(s) in the image data 102. In some instances, the renderer 120 may generate all samples within all intervals, and then perform a single batched MLP (multilayer perceptron) inference pass, which may help improve throughput. Additionally, or alternatively, the renderer 120 may use the surface(s) 114 as an auxiliary acceleration data structure to guide the sampling of one or more points along one or more rays cast into the scene 300, enabling the renderer 120 to efficiently skip empty space in the scene 300 and sample points where necessary for high perceptual quality. In some examples, the renderer 120 may use hardware-accelerated ray tracing to efficiently enumerate ordered intervals defined by the intersection of the ray and the surface(s) 114. Within each interval, the renderer 120 may query equally-spaced samples. In some instances, the renderer 120 may not require any dynamic adaptive sampling or sample-dependent termination criteria, which may help facilitate high-performance, parallel evaluation.

For example, the renderer 120 may obtain the surface(s) 114 to use as ray tracing acceleration data structure(s), including the inner surface(s) 116 and/or the outer surface(s) 118. The renderer 120 may then cast each ray against the surface(s) 114, which may yield a series of one or more intersections where the ray enters and/or exits the surface(s) 114, partitioning the ray in zero or more intervals contained in the surface(s) 114. For each interval with width (w), a target inter-sample spacing ($\delta_s$), and a single-sample threshold ($w_s$), the renderer 120 may compute the number of samples as:

$$\text{ceil}\left(\frac{\max(w - w_s, 0)}{\delta_s}\right) + 1$$

In some examples, the renderer 120 may cap the maximum number of samples to $N_{max}$, and equidistantly sample the interval. Note that if the interval has $w < w_s$, a single sample may be taken at the center of the interval (e.g., halfway between the inner surface(s) 116 and the outer surface(s) 118). In some instances, when an interval ends because a ray hits the inner surface(s) 116, the renderer 120 may refrain from processing subsequent samples, as this may represent the interior of a solid object. Otherwise, the renderer 120 may process intervals until the ray exits the scene or the ray has traversed a pre-determined maximum number of intervals.

Figure 4B:
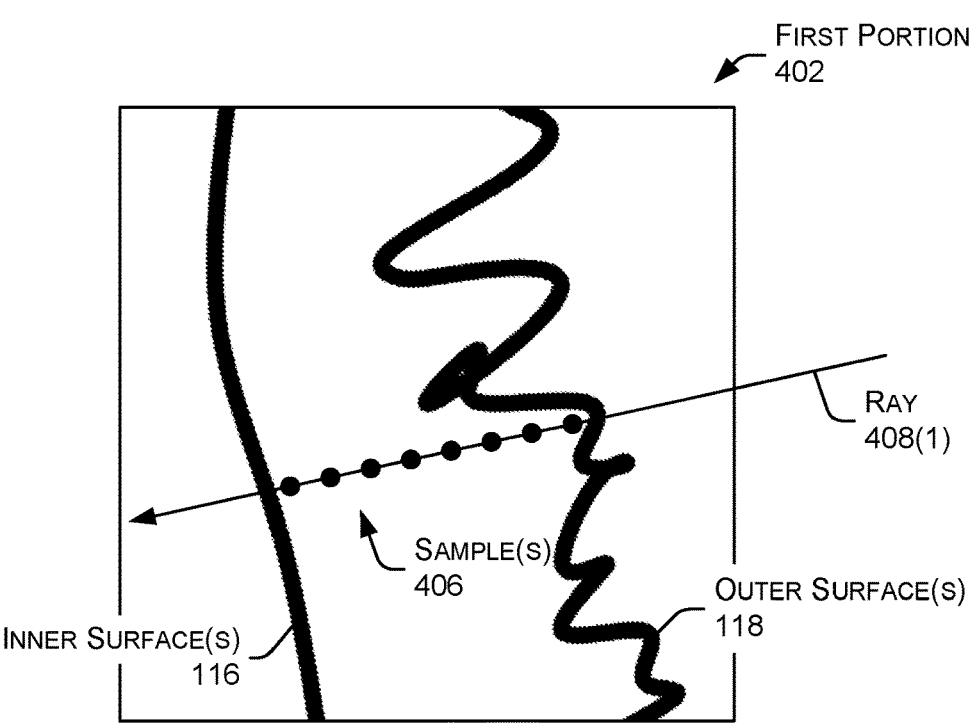
FIG. 4B illustrates a number of samples along a ray cast through a first portion of the example surface(s), in accordance with some embodiments of the present disclosure.

For example, FIG. 4B illustrates a number of sample(s) 406 along a ray 408(1) cast through the first portion 402 of the example surface(s), in accordance with some embodiments of the present disclosure. As shown, the number of sample(s) 406 may be equally spaced along the ray 408(1). Additionally, based at least on the distance between the inner surface(s) 116 and the outer surface(s) 118 being greater than a threshold, the number of the sample(s) 406 taken along the ray 408(1) is greater than one (e.g., seven samples) since this distance likely corresponds to a volumetric portion. For instance, the distance between the inner surface(s) 116 and the outer surface(s) 118 at the first portion 402 may correspond to seven inter-sample spacings ($\delta_s$).

Figure 4C:
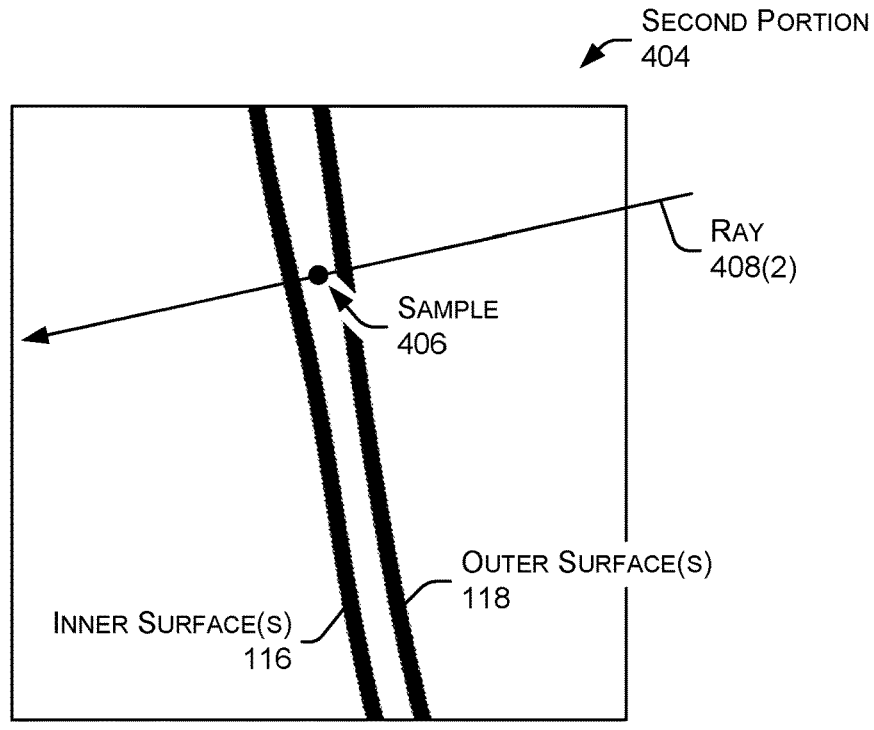
FIG. 4C illustrates a sample along a ray cast through a second portion of the example surface(s), in accordance with some embodiments of the present disclosure.

In contrast, FIG. 4C illustrates a sample 406 along a ray 408(2) cast through the second portion 404 of the example surface(s), in accordance with some embodiments of the present disclosure. Because the distance between the inner surface(s) 116 and the outer surface(s) 118 is relatively small in the second portion 404, only the single sample 406 is taken along the ray 408(2). For instance, the distance between the inner surface(s) 116 and the outer surface(s) 118 at the second portion 404 may be less than or equal to the single-sample threshold ($w_s$).

With reference now to FIG. 5, FIG. 5 is a data flow diagram illustrating an example process 500 for training one or more machine learning models to determine predictions about object characteristics, in accordance with some embodiments of the present disclosure. As shown, the machine learning model(s) 104 may be trained using input data 502 (e.g., training data). The input data 502 may comprise image data similar to the image data 102 (e.g., the input data 502 may comprise image data representing one or more objects).

The machine learning model(s) 104 may be trained using the training input data 502 as well as corresponding ground truth data 504 (which may correspond to the input data 502). That is, although referred to as "ground truth data," the ground truth data 504 may, in some examples, simply include the same data (e.g., images, etc.) as the input data 502. In some examples, the ground truth data 504 may include annotations, labels, masks, and/or the like. For example, in some embodiments, the ground truth data 504 may indicate actual values associated with the object(s) within the image data. For instance, and for an object, the values may include, but are not limited to, a x-coordinate location, a y-coordinate location, a z-coordinate location, a height, a width, a length, a density, RGB values, kernel sizes, prediction(s), surface(s), bounding shell(s), and/or any other parameter. The ground truth data 504 may be generated within a drawing program (e.g., an annotation program), a computer aided design (CAD) program, a labeling program, another type of program suitable for generating the ground truth data 504, and/or may be hand drawn, in some examples. In any example, the ground truth data 504 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer).

A training engine 508 may use one or more loss functions that measure loss (e.g., error) in output data 510 (which may include or otherwise be similar to the spatially varying kernel 106, the representation(s) 108, and/or the prediction(s) 110) generated by the machine learning model(s) 104 as compared to the ground truth data 504 and/or the input data 502. In some examples, the training engine 508 may compare the output data 510 (e.g., a final, rendered image) from the machine learning model(s) 104 to the input data 502 (e.g., input images), and optimize the machine learning model(s) 104 (and/or the spatially varying kernel 106, etc.) based at least on the comparing. That is, the training engine 508 may update/optimize one or more parameters 506 associated with the machine learning model(s) 104 to reduce the losses/differences between the output data 510 (e.g., novel renderings) and the input data 502 (e.g., input images). Any type of loss function may be used, such as cross entropy loss, mean squared error, mean absolute error, mean bias error, and/or other loss function types. In some examples, different outputs may have different loss functions. For example, the x-coordinate location may include a first loss, the y-coordinate location may include a second loss, the z-coordinate location may include a third loss, and/or so forth. In such examples, the loss functions may be combined to form a total loss, and the total loss may be used to train (e.g., update the parameters of) the machine learning model(s) 104 and/or the spatially varying kernel 106. In any example, backward pass computations may be performed to recursively compute gradients of the loss function(s) with respect to training parameters. In some examples, weight and biases of the machine learning model(s) 104 may be used to compute these gradients.

Now referring to FIG. 6, each block of method 600, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 600 is described, by way of example, with respect to the system of FIG. 1. However, this method may additionally or alternatively be executed by any one system, or any combination of systems, including, but not limited to, those described herein.

FIG. 6 is a flow diagram illustrating an example method 600 for rendering a scene, in accordance with some embodiments of the present disclosure. The method 600, at block B602, includes applying, to a machine learning model(s), image data capturing a view(s) of an object. For instance, the image data 102 may be applied to the machine learning model(s) 104.

At block B604, the method 600 includes determining a prediction(s) indicating a characteristic(s) of a portion(s) of a 3D representation of the object. For instance, the machine learning model(s) 104 may determine the prediction(s) 110 indicating the characteristic(s) of the portion(s) of the representation(s) 108 of the object. In some examples, the prediction(s) may be represented as a spatially varying kernel size that is included in a neural output. In some instances, the 3D representation may be represented as a neural radiance field.

At block B606, the method 600 includes generating a surface(s) corresponding to the portion(s) of the 3D representation of the object. For instance, the surface generator 112 may generate the surface(s) 114 corresponding to the portion(s) of the representation(s) 108 of the object. In some examples, the surface generator 112 may generate the surface(s) 114 using the prediction(s) 110 and based at least on the characteristic(s). In some examples, the surface(s) may be part of a bounding shell encapsulating the object. The bounding shell may include an inner surface and an outer surface. Additionally, in some examples, a thickness of the bounding shell may vary at different portions based on the characteristics of the object. For instance, at volumetric portions of the object the bounding shell may be thicker, while at opaque portions of the object the bounding shell may be thinner.

At block B608, the method 600 includes casting a ray(s) into a scene to determine an intersection(s) between the ray(s) and the surface(s). For instance, the renderer 120 may cast the ray(s) into a scene to determine the intersection(s) between the ray(s) and the surface(s) 114. That is, the rays may be cast into the scene to determine portions of the scene that can be skipped during rendering (e.g., blank space), portions of the scene where a small number of samples may be needed (e.g., opaque surfaces), and portions of the scene where a larger number of samples may be needed (e.g., volumetric regions).

At block B610, the method 600 includes generating a sample(s) of the 3D representation of the object using a location(s) in the scene that correspond to the intersection(s). For instance, the renderer 120 may generate the sample(s) of the representation(s) 108 of the object using the location(s) in the scene that correspond to the intersection(s). That is, the samples may be obtained from portions of the representation that contribute more significantly to the rendering.

At block B612, the method 600 includes rendering an image(s) of the object. For instance, the renderer 120 may render the image(s) 122 of the object. In some examples, the renderer 120 may render the image(s) 122 using the one or more samples. The image(s) of the object may comprise novel views of the object from angles previously not captured.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, novel-view synthesis, data center processing, conversational AI, light transport simulation (e.g., ray tracing, path tracing, etc.), collaborative content creation for 3D assets, cloud computing, generative AI, (large) language models, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing novel-view synthesis, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, systems for performing generative AI operations, systems for performing operations using a large language model, and/or other types of systems.

Example Parallel Processing Architecture

Figure 7:
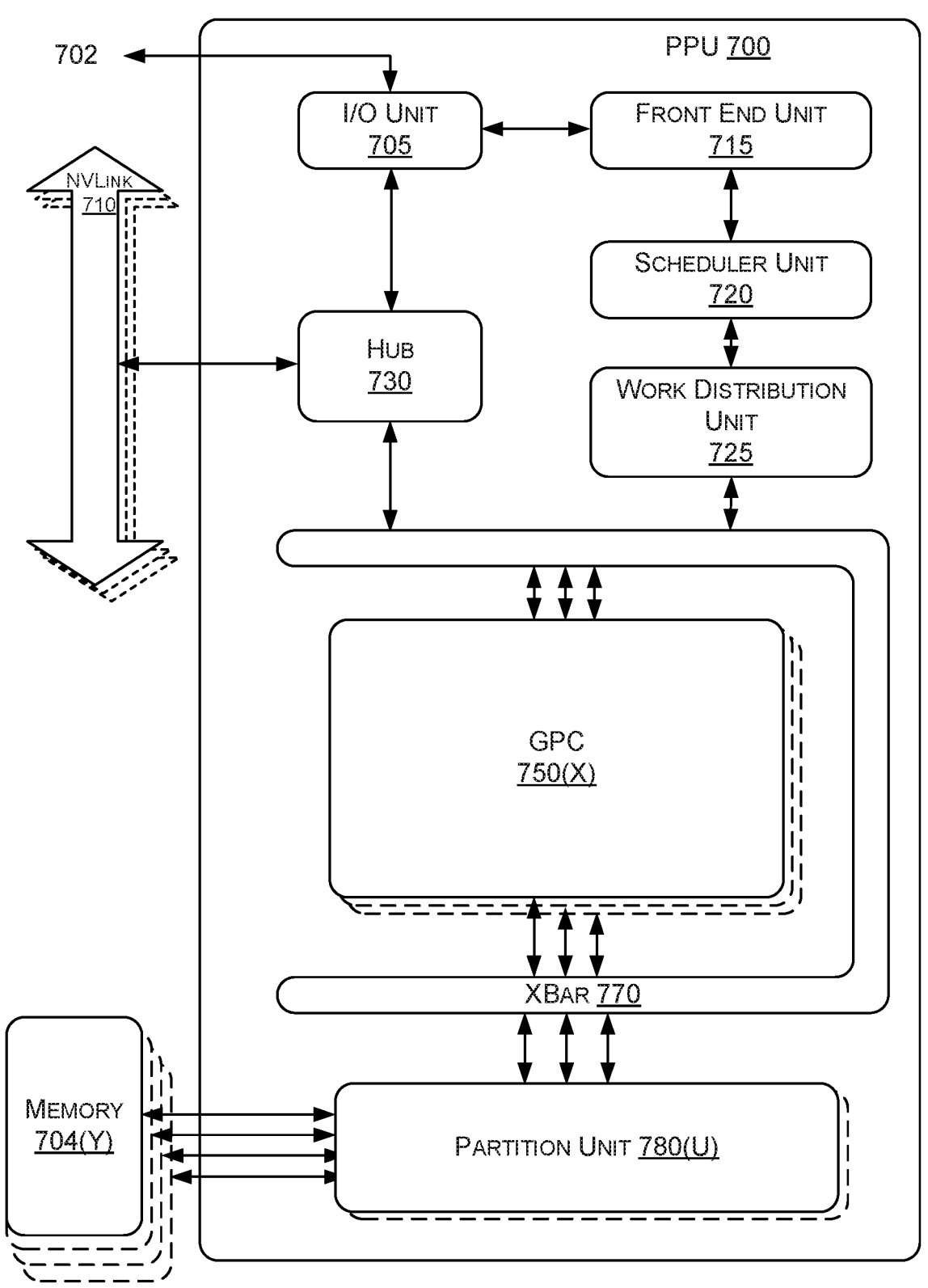
FIG. 7 illustrates an example parallel processing unit suitable for use in implementing at least some embodiments of the present disclosure.

FIG. 7 illustrates an example parallel processing unit (PPU) 700 suitable for use in implementing at least some embodiments of the present disclosure. In at least one embodiment, the PPU 700 is a multi-threaded processor that is implemented on one or more integrated circuit devices. The PPU 700 may have a latency hiding architecture designed to process many threads in parallel. A thread (e.g., a thread of execution) may refer to an instantiation of a set of instructions configured to be executed by the PPU 700. In at least one embodiment, the PPU 700 is a graphics processing unit (GPU) configured to implement a graphics rendering pipeline for processing three-dimensional (3D) graphics data in order to generate two-dimensional (2D) image data for display on a display device such as a liquid crystal display (LCD) device. In one or more embodiments, the PPU 700 may be used for performing general-purpose computations. While one parallel processor is provided herein for illustrative purposes, it should be noted that such processor is set forth for illustrative purposes only, and that any processor may be employed to supplement and/or substitute for the same.

One or more PPUs 700 may be configured to accelerate, by way of example and not limitation, thousands of High-Performance Computing (HPC), data center, and machine learning applications. The PPU 700 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, light transport simulation, astronomy, molecular dynamics simulation, financial modeling, robotics, digital twinning, synthetic data generation, factory automation, real-time language translation, online search optimizations, personalized user recommendations, and the like.

As shown in FIG. 7, the PPU 700 includes an Input/Output (I/O) unit 705, a front end unit 715, a scheduler unit 720, a work distribution unit 725, a hub 730, a crossbar (Xbar) 770, one or more general processing clusters (GPCs) 750, and one or more partition units 780. The PPU 700 may be connected to a host processor or other PPUs 700 via one or more high-speed NVLink 710 interconnect. The PPU 700 may be connected to a host processor or other peripheral devices via an interconnect 702. The PPU 700 may also be connected to a local memory comprising a number of memory devices 704. In at least one embodiment, the local memory may comprise a number of dynamic random-access memory (DRAM) devices. The DRAM devices may be configured as a high-bandwidth memory (HBM) subsystem, with multiple DRAM dies stacked within each device.

The NVLink 710 interconnect enables systems to scale and include one or more PPUs 700 combined with one or more CPUs, supports cache coherence between the PPUs 700 and CPUs, and CPU mastering. Data and/or commands may be transmitted by the NVLink 710 through the hub 730 to/from other units of the PPU 700 such as one or more copy engines, a video encoder, a video decoder, a power management unit, etc. (not explicitly shown).

The I/O unit 705 may be configured to transmit and receive communications (e.g., commands, data, etc.) from a host processor (not shown) over the interconnect 702. The I/O unit 705 may communicate with the host processor directly via the interconnect 702 or through one or more intermediate devices such as a memory bridge. In at least one embodiment, the I/O unit 705 may communicate with one or more other processors, such as one or more the PPUs 700 via the interconnect 702. In at least one embodiment, the I/O unit 705 implements a Peripheral Component Interconnect Express (PCIe) interface for communications over a PCIe bus and the interconnect 702 is a PCIe bus. In at least one embodiment, the I/O unit 705 may implement other types of well-known interfaces for communicating with external devices.

The I/O unit 705 decodes packets received via the interconnect 702. In at least one embodiment, the packets represent commands configured to cause the PPU 700 to perform various operations. The I/O unit 705 transmits the decoded commands to various other units of the PPU 700 as the commands may specify. For example, some commands may be transmitted to the front end unit 715. Other commands may be transmitted to the hub 730 or other units of the PPU 700 such as one or more copy engines, a video encoder, a video decoder, a power management unit, etc. (not explicitly shown). In other words, the I/O unit 705 may be configured to route communications between and among the various logical units of the PPU 700.

In at least one embodiment, a program executed by the host processor encodes a command stream in a buffer that provides workloads to the PPU 700 for processing. A workload may comprise several instructions and data to be processed by those instructions. The buffer may be a region in a memory that is accessible (e.g., read/write) by both the host processor and the PPU 700. For example, the I/O unit 705 may be configured to access the buffer in a system memory connected to the interconnect 702 via memory requests transmitted over the interconnect 702. In at least one embodiment, the host processor writes the command stream to the buffer and then transmits a pointer to the start of the command stream to the PPU 700. The front end unit 715 receives pointers to one or more command streams. The front end unit 715 manages the one or more streams, reading commands from the streams and forwarding commands to the various units of the PPU 700.

The front end unit 715 is coupled to a scheduler unit 720 that configures the various GPCs 750 to process tasks defined by the one or more streams. The scheduler unit 720 is configured to track state information related to the various tasks managed by the scheduler unit 720. The state may indicate which GPC 750 a task is assigned to, whether the task is active or inactive, a priority level associated with the task, and so forth. The scheduler unit 720 manages the execution of a plurality of tasks on the one or more GPCs 750.

The scheduler unit 720 is coupled to a work distribution unit 725 that is configured to dispatch tasks for execution on the GPCs 750. The work distribution unit 725 may track a number of scheduled tasks received from the scheduler unit 720. In at least one embodiment, the work distribution unit 725 manages a pending task pool and an active task pool for each of the GPCs 750. The pending task pool may comprise a number of slots (e.g., 32 slots) that contain tasks assigned to be processed by a particular GPC 750. The active task pool may comprise a number of slots (e.g., 4 slots) for tasks that are actively being processed by the GPCs 750. As a GPC 750 finishes the execution of a task, that task may be evicted from the active task pool for the GPC 750 and one of the other tasks from the pending task pool is selected and scheduled for execution on the GPC 750. If an active task has been idle on the GPC 750, such as while waiting for a data dependency to be resolved, then the active task may be evicted from the GPC 750 and returned to the pending task pool while another task in the pending task pool is selected and scheduled for execution on the GPC 750.

The work distribution unit 725 communicates with the one or more GPCs 750 via XBar 770. The XBar 770 is an interconnect network that couples many of the units of the PPU 700 to other units of the PPU 700. For example, the XBar 770 may be configured to couple the work distribution unit 725 to a particular GPC 750. Although not shown explicitly, one or more other units of the PPU 700 may also be connected to the XBar 770 via the hub 730.

The tasks are managed by the scheduler unit 720 and dispatched to a GPC 750 by the work distribution unit 725. The GPC 750 is configured to process the task and generate results. The results may be consumed by other tasks within the GPC 750, routed to a different GPC 750 via the XBar 770, or stored in the memory 704. The results can be written to the memory 704 via the partition units 780, which may implement a memory interface for reading and writing data to/from the memory 704. The results can be transmitted to another PPU 700 or CPU via the NVLink 710. In at least one embodiment, the PPU 700 includes a number U of partition units 780 that is equal to the number of separate and distinct memory devices 704 coupled to the PPU 700.

In at least one embodiment, a host processor executes a driver kernel that implements an application programming interface (API) that enables one or more applications executing on the host processor to schedule operations for execution on the PPU 700. In at least one embodiment, multiple compute applications are simultaneously executed by the PPU 700 and the PPU 700 provides isolation, quality of service (QOS), and independent address spaces for the multiple compute applications. An application may generate instructions (e.g., API calls) that cause the driver kernel to generate one or more tasks for execution by the PPU 700. The driver kernel may output tasks to one or more streams being processed by the PPU 700. Each task may comprise one or more groups of related threads, wherein may be referred to as a warp. In at least one embodiment, a warp comprises 32 related threads that may be executed in parallel. Cooperating threads may refer to a plurality of threads including instructions to perform the task and that may exchange data through shared memory.

Figure 8A:
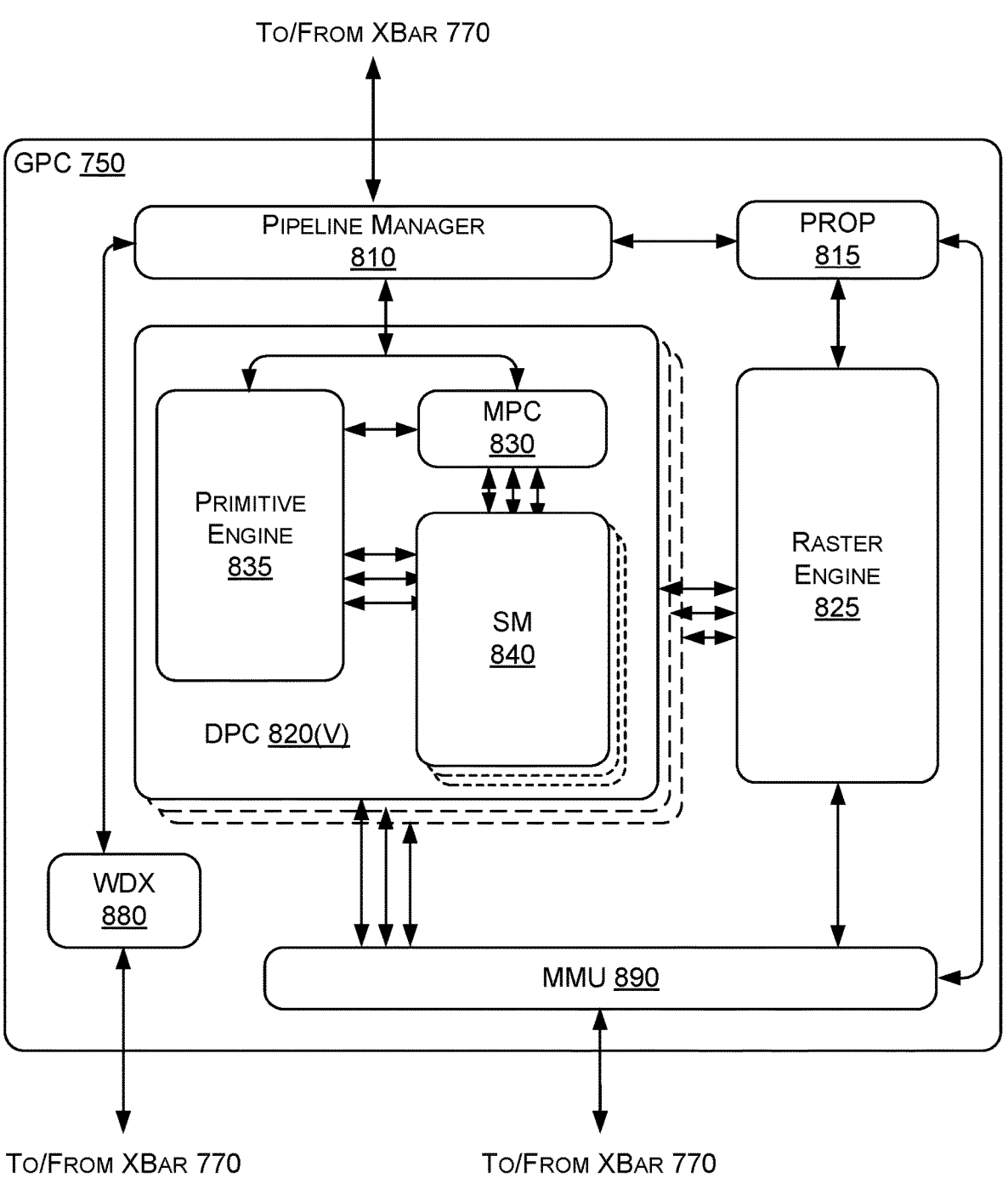
FIG. 8A illustrates an example general processing cluster within the parallel processing unit of FIG. 7 suitable for use in implementing at least some embodiments of the present disclosure.

FIG. 8A illustrates an example GPC 750 of the PPU 700 of FIG. 7 suitable for use in implementing at least some embodiments of the present disclosure. As shown in FIG. 8A, each GPC 750 may include a number of hardware units for processing tasks. In at least one embodiment, each GPC 750 includes a pipeline manager 810, a pre-raster operations unit (PROP) 815, a raster engine 825, a work distribution crossbar (WDX) 880, a memory management unit (MMU) 890, and one or more Data Processing Clusters (DPCs) 820. It will be appreciated that the GPC 750 of FIG. 8A may include other hardware units in lieu of or in addition to the units shown in FIG. 8A.

In at least one embodiment, the operation of the GPC 750 is controlled by the pipeline manager 810. The pipeline manager 810 manages the configuration of the one or more DPCs 820 for processing tasks allocated to the GPC 750. In at least one embodiment, the pipeline manager 810 may configure at least one of the one or more DPCs 820 to implement at least a portion of a graphics rendering pipeline. For example, a DPC 820 may be configured to execute a vertex shader program on the programmable streaming multiprocessor (SM) 840. The pipeline manager 810 may also be configured to route packets received from the work distribution unit 725 to the appropriate logical units within the GPC 750. For example, some packets may be routed to fixed function hardware units in the PROP 815 and/or raster engine 825 while other packets may be routed to the DPCs 820 for processing by the primitive engine 835 or the SM 840. In at least one embodiment, the pipeline manager 810 may configure at least one of the one or more DPCs 820 to implement a neural network model and/or a computing pipeline.

The PROP unit 815 may be configured to route data generated by the raster engine 825 and the DPCs 820 to a Raster Operations (ROP) unit. The PROP unit 815 may also be configured to perform optimizations for color blending, organizing pixel data, performing address translations, and the like.

The raster engine 825 may include a number of fixed function hardware units configured to perform various raster operations. In at least one embodiment, the raster engine 825 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 825 comprises fragments to be processed, for example, by a fragment shader implemented within a DPC 820.

Each DPC 820 included in the GPC 750 includes an M-Pipe Controller (MPC) 830, a primitive engine 835, and one or more SMs 840. The MPC 830 controls the operation of the DPC 820, routing packets received from the pipeline manager 810 to the appropriate units in the DPC 820. For example, packets associated with a vertex may be routed to the primitive engine 835, which is configured to fetch vertex attributes associated with the vertex from the memory 704. In contrast, packets associated with a shader program may be transmitted to the SM 840.

The SM 840 comprises a programmable streaming processor that is configured to process tasks represented by a number of threads. Each SM 840 is multi-threaded and configured to execute a plurality of threads (e.g., 32 threads) from a particular group of threads concurrently. In at least one embodiment, the SM 840 implements a SIMD (Single-Instruction, Multiple-Data) architecture where each thread in a group of threads (e.g., a warp) is configured to process a different set of data based on the same set of instructions. All threads in the group of threads execute the same instructions. In at least one embodiment, the SM 840 implements a SIMT (Single-Instruction, Multiple Thread) architecture where each thread in a group of threads is configured to process a different set of data based on the same set of instructions, but where individual threads in the group of threads are allowed to diverge during execution. In at least one embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

The MMU 890 may provide an interface between the GPC 750 and the partition unit 780. The MMU 890 may provide translation of virtual addresses into physical addresses, memory protection, and arbitration of memory requests. In at least one embodiment, the MMU 890 provides one or more translation lookaside buffers (TLBs) for performing translation of virtual addresses into physical addresses in the memory 704.

Figure 8B:
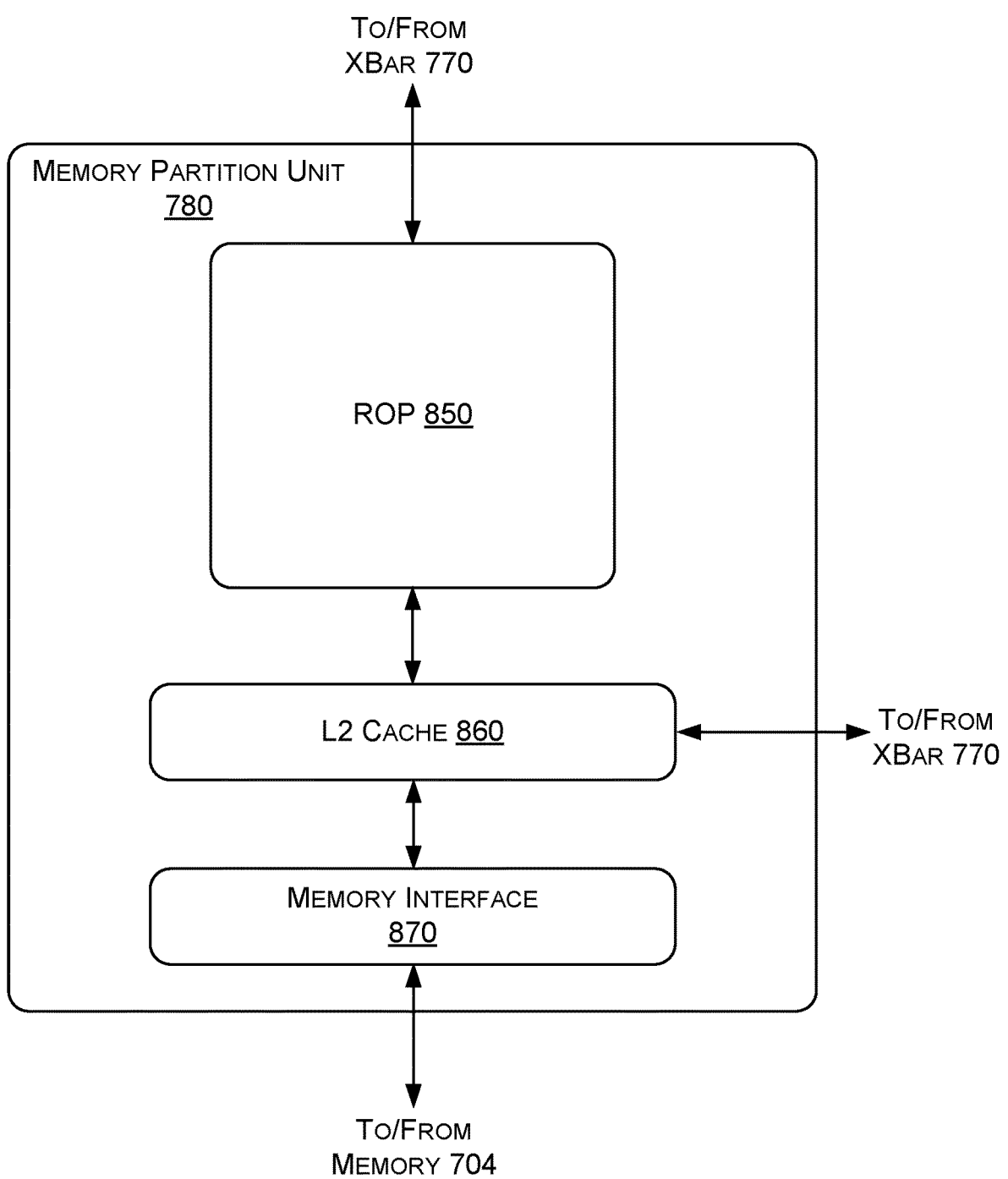
FIG. 8B illustrates an example memory partition unit of the parallel processing unit of FIG. 7 suitable for use in implementing at least some embodiments of the present disclosure.

FIG. 8B illustrates an example memory partition unit 780 of the PPU 700 of FIG. 7 suitable for use in implementing at least some embodiments of the present disclosure. As shown in FIG. 8B, the memory partition unit 780 includes a Raster Operations (ROP) unit 850, a level two (L2) cache 860, and a memory interface 870. The memory interface 870 may be coupled to the memory 704. Memory interface 870 may implement 32, 64, 128, 1024-bit data buses, or the like, for high-speed data transfer. In at least one embodiment, the PPU 700 incorporates U memory interfaces 870, one memory interface 870 per pair of partition units 780, where each pair of partition units 780 is connected to a corresponding memory device 704. For example, the PPU 700 may be connected to up to Y memory devices 704, such as high bandwidth memory stacks or graphics double-data-rate, version 5, synchronous dynamic random access memory, or other types of persistent storage.

In at least one embodiment, the memory interface 870 implements an HBM2 memory interface and Y equals half U. In at least one embodiment, the HBM2 memory stacks are located on the same physical package as the PPU 700, providing substantial power and area savings compared with conventional GDDR5 SDRAM systems. In at least one embodiment, each HBM2 stack includes four memory dies and Y equals 4, with HBM2 stack including two 128-bit channels per die for a total of 8 channels and a data bus width of 1024 bits.

In at least one embodiment, the memory 704 supports Single-Error Correcting Double-Error Detecting (SECDED) Error Correction Code (ECC) to protect data. ECC provides high reliability for compute applications that are sensitive to data corruption. Reliability is especially important in large-scale cluster computing environments where the PPUs 700 process very large datasets and/or run applications for extended periods.

In at least one embodiment, the PPU 700 implements a multi-level memory hierarchy. In at least one embodiment, the memory partition unit 780 supports a unified memory to provide a single unified virtual address space for CPU and PPU 700 memory, enabling data sharing between virtual memory systems. In at least one embodiment the frequency of accesses by a PPU 700 to memory located on other processors is traced to ensure that memory pages are moved to the physical memory of the PPU 700 that is accessing the pages more frequently. In at least one embodiment, the NVLink 710 supports address translation services allowing the PPU 700 to directly access a CPU's page tables and providing full access to CPU memory by the PPU 700.

In at least one embodiment, copy engines transfer data between multiple PPUs 700 or between PPUs 700 and CPUs. The copy engines can generate page faults for addresses that are not mapped into the page tables. The memory partition unit 780 can then service the page faults, mapping the addresses into the page table, after which the copy engine can perform the transfer. With hardware page faulting, addresses can be passed to the copy engines without worrying if the memory pages are resident, and the copy process is transparent.

Data from the memory 704 or other system memory may be fetched by the memory partition unit 780 and stored in the L2 cache 860, which is located on-chip and is shared between the various GPCs 750. As shown, each memory partition unit 780 includes a portion of the L2 cache 860 associated with a corresponding memory device 704. Lower level caches may then be implemented in various units within the GPCs 750. For example, each of the SMs 840 may implement a level one (L1) cache. The L1 cache is private memory that may be dedicated to a particular SM 840. Data from the L2 cache 860 may be fetched and stored in each of the L1 caches for processing in the functional units of the SMs 840. The L2 cache 860 is coupled to the memory interface 870 and the XBar 770.

The ROP unit 850 performs graphics raster operations related to pixel color, such as color compression, pixel blending, and the like. The ROP unit 850 also implements depth testing in conjunction with the raster engine 825, receiving a depth for a sample location associated with a pixel fragment from the culling engine of the raster engine 825. The depth is tested against a corresponding depth in a depth buffer for a sample location associated with the fragment. If the fragment passes the depth test for the sample location, then the ROP unit 850 updates the depth buffer and transmits a result of the depth test to the raster engine 825. It will be appreciated that the number of partition units 780 may be different than the number of GPCs 750 and, therefore, each ROP unit 850 may be coupled to each of the GPCs 750. The ROP unit 850 may track packets received from the different GPCs 750 and determine which GPC 750 that a result generated by the ROP unit 850 is routed to through the Xbar 770. Although the ROP unit 850 is included within the memory partition unit 780 in FIG. 8B, in other examples, the ROP unit 850 may be outside of the memory partition unit 780. For example, the ROP unit 850 may reside in the GPC 750 or another unit.

Figure 9A:
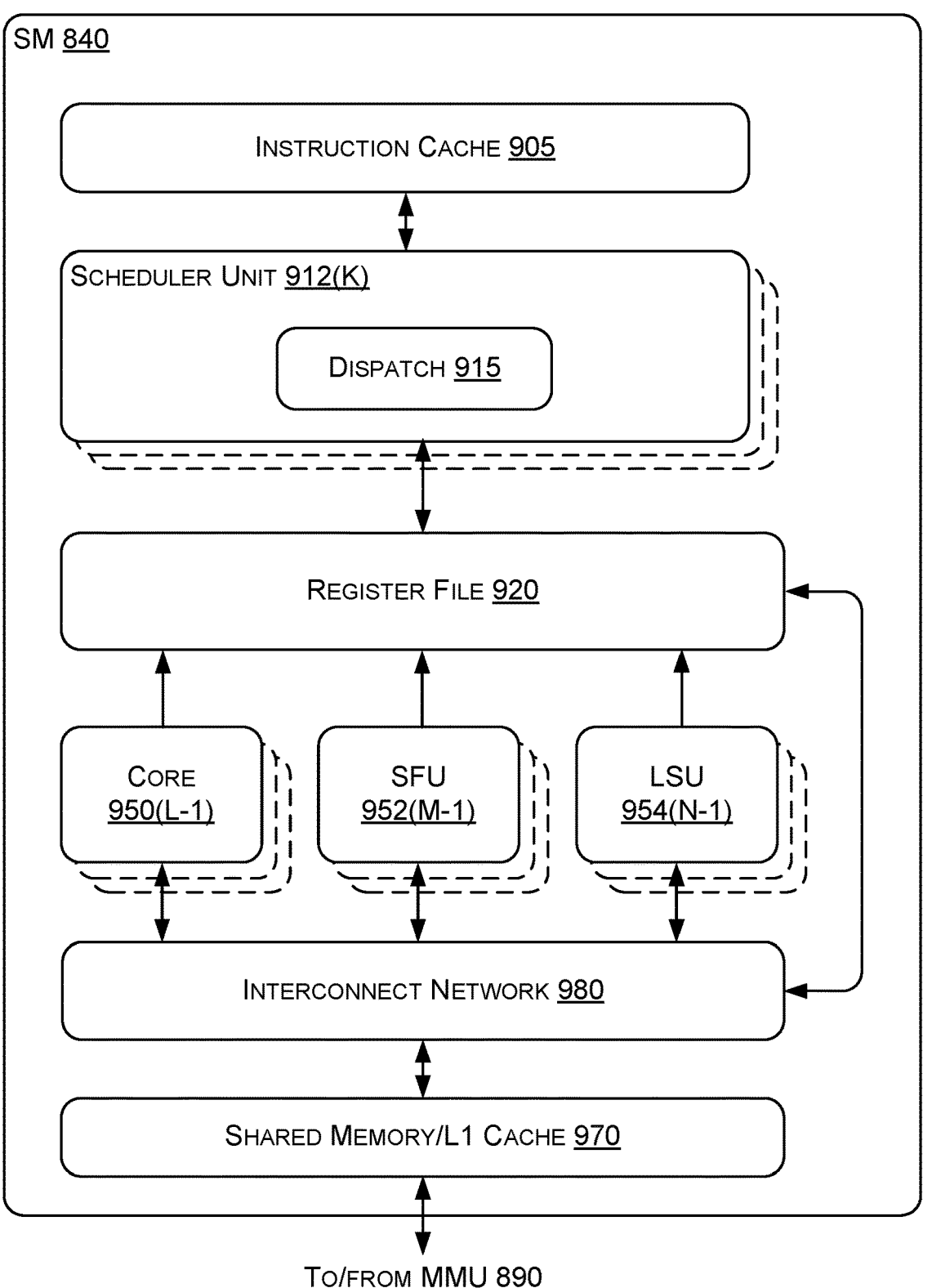
FIG. 9A illustrates an example of the streaming multi-processor of FIG. 8A suitable for use in implementing at least some embodiments of the present disclosure.

FIG. 9A illustrates an example of the streaming multi-processor 840 of FIG. 8A suitable for use in implementing at least some embodiments of the present disclosure. As shown in FIG. 9A, the SM 840 includes an instruction cache 905, one or more scheduler units 912, a register file 920, one or more processing cores 950, one or more special function units (SFUs) 952, one or more load/store units (LSUs) 954, an interconnect network 980, and a shared memory/L1 cache 970.

As described herein, the work distribution unit 725 dispatches tasks for execution on the GPCs 750 of the PPU 700. The tasks may be allocated to a particular DPC 820 within a GPC 750 and, if the task is associated with a shader program, the task may be allocated to an SM 840. The scheduler unit 912 may receive the tasks from the work distribution unit 725 and manage instruction scheduling for one or more thread blocks assigned to the SM 840. The scheduler unit 912 may schedule thread blocks for execution as warps of parallel threads, where each thread block is allocated at least one warp. In at least one embodiment, each warp executes 32 threads. The scheduler unit 912 may manage a plurality of different thread blocks, allocating the warps to the different thread blocks and then dispatching instructions from the plurality of different cooperative groups to the various functional units (e.g., cores 950, SFUs 952, and LSUs 954) during each clock cycle.

Cooperative Groups may refer to a programming model for organizing groups of communicating threads that allows developers to express the granularity at which threads are communicating, enabling the expression of richer, more efficient parallel decompositions. Cooperative launch APIs may support synchronization amongst thread blocks for the execution of parallel algorithms. Conventional programming models provide a single, simple construct for synchronizing cooperating threads: a barrier across all threads of a thread block (e.g., the syncthreads ( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 915 may be configured to transmit instructions to one or more of the functional units. In at least one embodiment, the scheduler unit 912 includes two dispatch units 915 that enable two different instructions from the same warp to be dispatched during each clock cycle. In at least embodiment, each scheduler unit 912 may include a single dispatch unit 915 or additional dispatch units 915.

Each SM 840 may include a register file 920 that provides a set of registers for the functional units of the SM 840. In at least one embodiment, the register file 920 is divided between each of the functional units such that each functional unit is allocated a dedicated portion of the register file 920. In at least one embodiment, the register file 920 is divided between the different warps being executed by the SM 840. The register file 920 provides temporary storage for operands connected to the data paths of the functional units.

Each SM 840 may include Z processing cores 950. In at least one embodiment, the SM 840 includes a large number (e.g., 128, etc.) of distinct processing cores 950. Each core 950 may include a fully-pipelined, single-precision, double-precision, and/or mixed precision processing unit that includes a floating point arithmetic logic unit and an integer arithmetic logic unit. In at least one embodiment, the floating point arithmetic logic units implement the IEEE 754-2008 standard for floating point arithmetic. In at least one embodiment, the cores 950 include 64 single-precision (32-bit) floating point cores, 64 integer cores, 32 double-precision (64-bit) floating point cores, and 8 tensor cores.

Tensor cores configured to perform matrix operations, and, in at least one embodiment, one or more tensor cores are included in the cores 950. In particular, the tensor cores may be configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

Training complex neural networks requires massive amounts of parallel computing performance, including floating-point multiplications and additions that are supported by the PPU 700. Inferencing is less compute-intensive than training, being a latency-sensitive process where a trained neural network is applied to new inputs it has not seen before to classify images, translate speech, and infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 700 may form a computing platform capable of delivering performance required for deep neural network-based artificial intelligence and machine learning applications.

In at least one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores may be used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 840 may also include M SFUs 952 that perform special functions (e.g., attribute evaluation, reciprocal square root, and the like). In at least one embodiment, the SFUs 952 may include a tree traversal unit configured to traverse a hierarchical tree data structure. In at least one embodiment, the SFUs 952 may include texture unit configured to perform texture map filtering operations. In at least one embodiment, the texture units are configured to load texture maps (e.g., a 2D array of texels) from the memory 704 and sample the texture maps to produce sampled texture values for use in shader programs executed by the SM 840. In at least one embodiment, the texture maps are stored in the shared memory/L1 cache 870. The texture units implement texture operations such as filtering operations using mip-maps (e.g., texture maps of varying levels of detail). In at least one embodiment, each SM 840 includes two texture units.

Each SM 840 may also include N LSUs 954 that implement load and store operations between the shared memory/L1 cache 970 and the register file 920. Each SM 840 may include an interconnect network 980 that connects each of the functional units to the register file 920 and the LSU 954 to the register file 920, shared memory/L1 cache 970. In at least one embodiment, the interconnect network 980 is a crossbar that can be configured to connect any of the functional units to any of the registers in the register file 920 and connect the LSUs 954 to the register file and memory locations in shared memory/L1 cache 970.

The shared memory/L1 cache 970 may include an array of on-chip memory that allows for data storage and communication between the SM 840 and the primitive engine 835 and between threads in the SM 840. In at least one embodiment, the shared memory/L1 cache 970 comprises 128 KB of storage capacity and is in the path from the SM 840 to the partition unit 780. The shared memory/L1 cache 970 can be used to cache reads and writes. One or more of the shared memory/L1 cache 970, L2 cache 860, and memory 704 may be backing stores.

Combining data cache and shared memory functionality into a single memory block may provide the best overall performance for both types of memory accesses. The capacity may be usable as a cache by programs that do not use shared memory. For example, if shared memory is configured to use half of the capacity, texture and load/store operations can use the remaining capacity. Integration within the shared memory/L1 cache 970 may enable the shared memory/L1 cache 970 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 7, may be bypassed, creating a much simpler programming model. In the general-purpose parallel computation configuration, the work distribution unit 725 may assign and distribute blocks of threads directly to the DPCs 820. The threads in a block may execute the same program, using a unique thread ID in the calculation to ensure each thread generates unique results, using the SM 840 to execute the program and perform calculations, shared memory/L1 cache 970 to communicate between threads, and the LSU 954 to read and write global memory through the shared memory/L1 cache 970 and the memory partition unit 780. When configured for general purpose parallel computation, the SM 840 can also write commands that the scheduler unit 720 can use to launch new work on the DPCs 820.

The PPU 700 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In at least one embodiment, the PPU 700 is embodied on a single semiconductor substrate. In at least one embodiment, the PPU 700 is included in a system-on-a-chip (SoC) along with one or more other devices such as additional PPUs 700, the memory, a reduced instruction set computer (RISC) CPU, a memory management unit (MMU), a digital-to-analog converter (DAC), and the like.

In at least one embodiment, the PPU 700 may be included on a graphics card that includes one or more memory devices 704. The graphics card may be configured to interface with a PCIe slot on a motherboard of a desktop computer. In at least one embodiment, the PPU 700 may be an integrated graphics processing unit (iGPU) or parallel processor included in the chipset of the motherboard.

Example of a Computing System

Systems with multiple GPUs and CPUs are used in a variety of industries as developers expose and use more parallelism in applications such as artificial intelligence computing. High-performance GPU-accelerated systems with tens to many thousands or more of compute nodes are deployed in data centers, research facilities, and supercomputers to solve ever larger problems. As the number of processing devices within the high-performance systems increases, the communication and data transfer mechanisms need to scale to support the increased bandwidth.

Figure 9B:
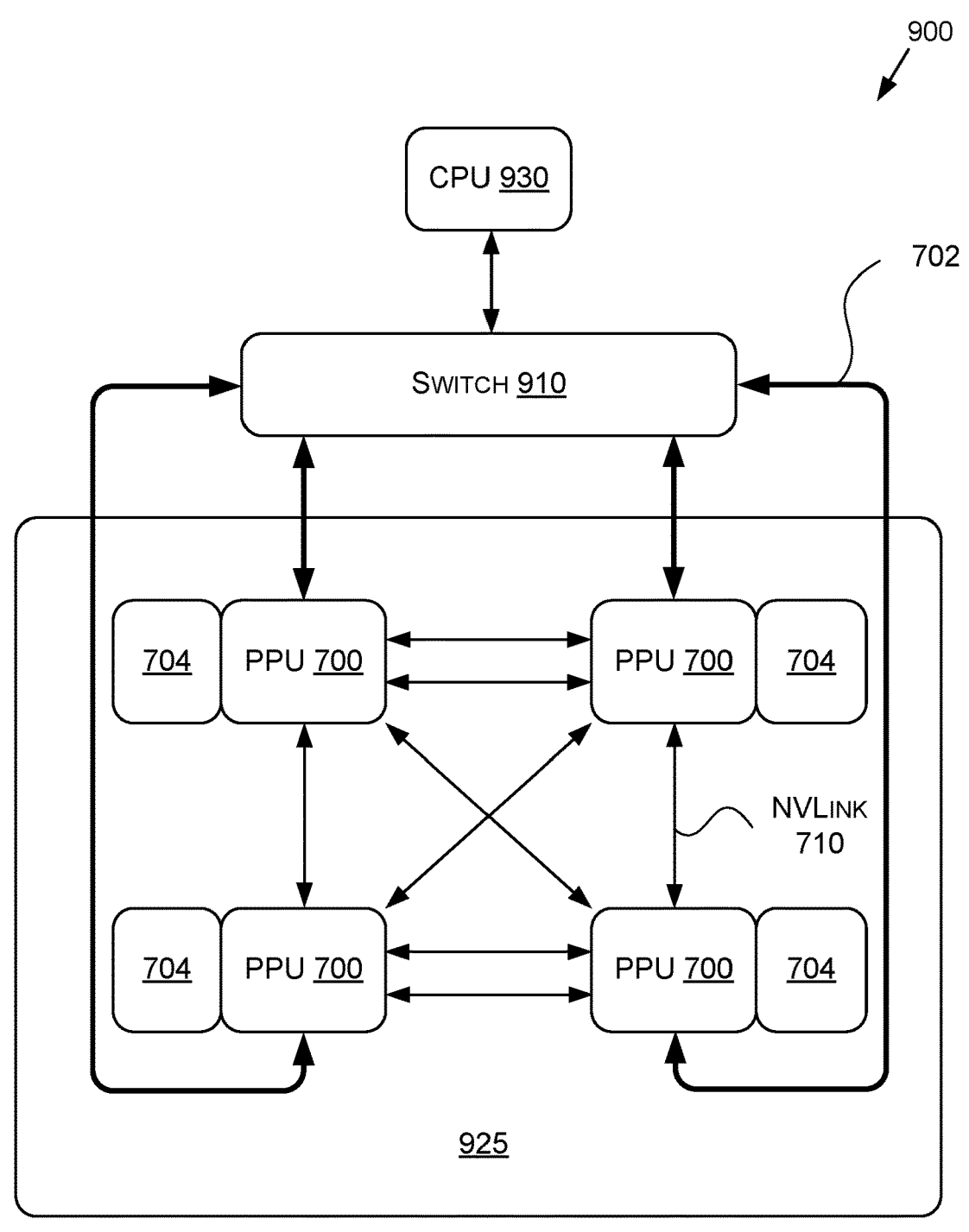
FIG. 9B is an example conceptual diagram of a processing system implemented using the PPU of FIG. 7 suitable for use in implementing at least some embodiments of the present disclosure.

FIG. 9B is an example conceptual diagram of a processing system 900 implemented using the PPU 700 of FIG. 7 suitable for use in implementing at least some embodiments of the present disclosure. The processing system 900 includes a CPU 930, switch 910, and multiple PPUs 700 each and respective memories 704. The NVLink 710 provides high-speed communication links between each of the PPUs 700. Although a particular number of NVLink 710 and interconnect 702 connections are illustrated in FIG. 9B, the number of connections to each PPU 700 and the CPU 930 may vary. The switch 910 interfaces between the interconnect 702 and the CPU 930. The PPUs 700, memories 704, and NVLinks 710 may be situated on a single semiconductor platform to form a parallel processing system 925. In at least one embodiment, the switch 910 supports two or more protocols to interface between various different connections and/or links.

In at least embodiment (not shown), the NVLink 710 provides one or more high-speed communication links between each of the PPUs 700 and the CPU 930 and the switch 910 interfaces between the interconnect 702 and each of the PPUs 700. The PPUs 700, memories 704, and interconnect 702 may be situated on a single semiconductor platform to form a parallel processing module 925. In at least one embodiment (not shown), the interconnect 702 provides one or more communication links between each of the PPUs 700 and the CPU 930 and the switch 910 interfaces between each of the PPUs 700 using the NVLink 710 to provide one or more high-speed communication links between the PPUs 700. In at least one embodiment (not shown), the NVLink 710 provides one or more high-speed communication links between the PPUs 700 and the CPU 930 through the switch 910. In yet at least one embodiment (not shown), the interconnect 702 provides one or more communication links between each of the PPUs 700 directly. One or more of the NVLink 710 high-speed communication links may be implemented as a physical NVLink interconnect or either an on-chip or on-die interconnect using the same protocol as the NVLink 710.

In the context of the present description, a single semiconductor platform may refer to a sole unitary semiconductor-based integrated circuit fabricated on a die or chip. The term single semiconductor platform may also refer to multichip modules with increased connectivity which simulate on-chip operation and make substantial improvements over using a conventional bus implementation. Of course, the various circuits or devices may also be situated separately or in various combinations of semiconductor platforms per the desires of the user. Alternately, the parallel processing module 925 may be implemented as a circuit board substrate and each of the PPUs 700 and/or memories 704 may be packaged devices. In at least one embodiment, the CPU 930, switch 910, and the parallel processing module 925 are situated on a single semiconductor platform.

In at least one embodiment, the signaling rate of each NVLink 710 is 20 to 25 Gigabits/second and each PPU 700 includes six NVLink 710 interfaces (as shown in FIG. 9B, five NVLink 710 interfaces are included for each PPU 700). Each NVLink 710 may provide a data transfer rate of 25 Gigabytes/second in each direction, with six links providing 700 Gigabytes/second. The NVLinks 710 can be used exclusively for PPU-to-PPU communication as shown in FIG. 9B, or some combination of PPU-to-PPU and PPU-to-CPU, when the CPU 930 also includes one or more NVLink 710 interfaces.

In at least one embodiment, the NVLink 710 allows direct load/store/atomic access from the CPU 930 to each PPU's 700 memory 704. In at least one embodiment, the NVLink 710 supports coherency operations, allowing data read from the memories 704 to be stored in the cache hierarchy of the CPU 930, reducing cache access latency for the CPU 930. In at least one embodiment, the NVLink 710 includes support for Address Translation Services (ATS), allowing the PPU 700 to directly access page tables within the CPU 930. One or more of the NVLinks 710 may also be configured to operate in a low-power mode.

Figure 9C:
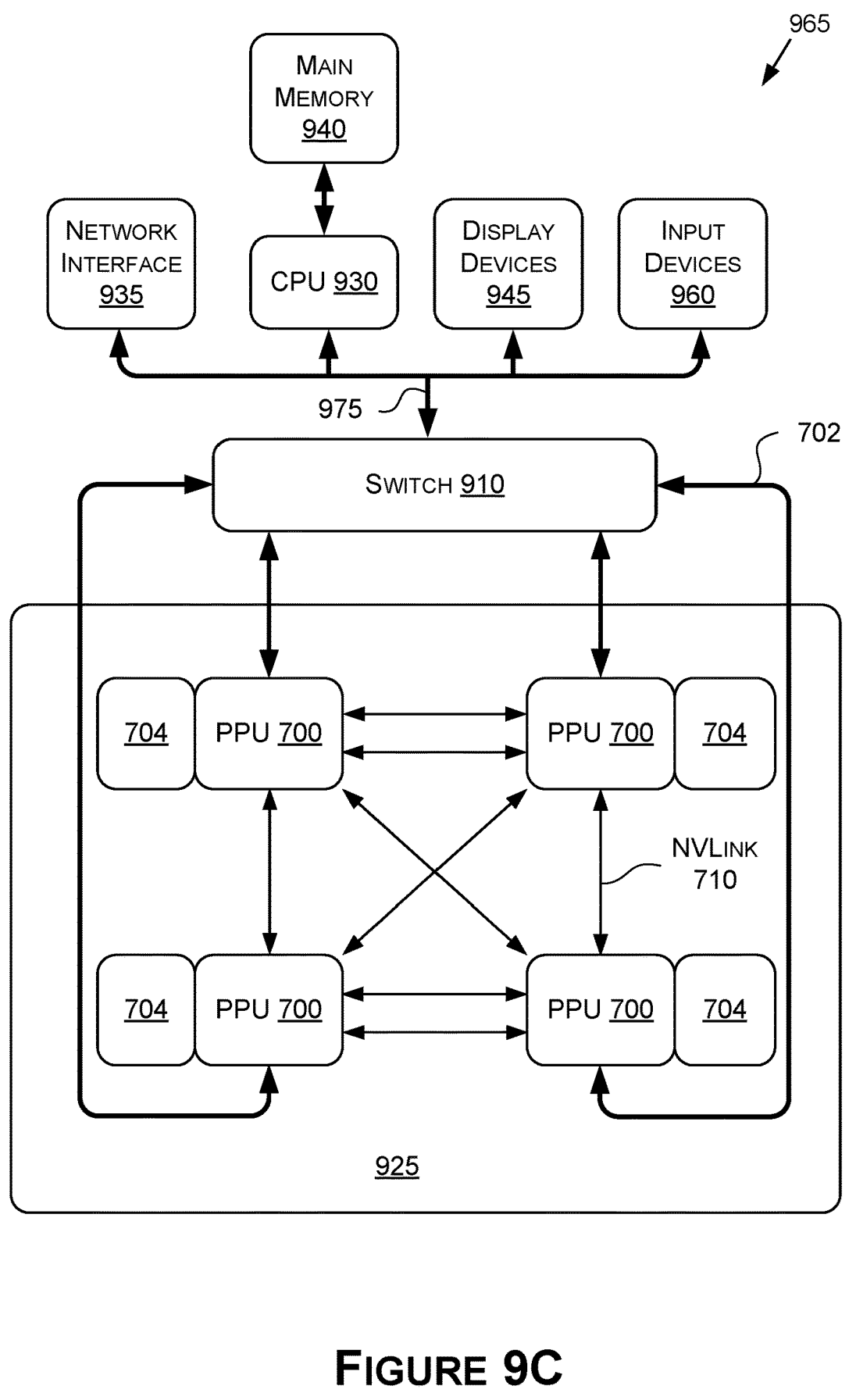

FIG. 9C illustrates an example system 965 in which the various architecture and/or functionality of the various previous embodiments may be implemented suitable for use in implementing at least some embodiments of the present disclosure.

As shown, a system 965 is provided including at least one central processing unit 930 that is connected to a communication bus 975. The communication bus 975 may be implemented using any suitable protocol, such as PCI (Peripheral Component Interconnect), PCI-Express, AGP (Accelerated Graphics Port), HyperTransport, or any other bus or point-to-point communication protocol(s). The system 965 also includes a main memory 940. Control logic (software) and data are stored in the main memory 940 which may take the form of random access memory (RAM).

The system 965 also includes input devices 960, the parallel processing system 925, and display devices 945, e.g. a conventional CRT (cathode ray tube), LCD (liquid crystal display), LED (light emitting diode), plasma display or the like. User input may be received from the input devices 960, e.g., keyboard, mouse, touchpad, microphone, and the like. Each of the foregoing modules and/or devices may even be situated on a single semiconductor platform to form the system 965. Alternately, the various modules may also be situated separately or in various combinations of semiconductor platforms per the desires of the user.

Further, the system 965 may be coupled to a network (e.g., a telecommunications network, local area network (LAN), wireless network, wide area network (WAN) such as the Internet, peer-to-peer network, cable network, or the like) through a network interface 935 for communication purposes.

The system 965 may also include a secondary storage (not shown). The secondary storage may include, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive may read from and/or writes to a removable storage unit.

Computer programs, or computer control logic algorithms, may be stored in the main memory 940 and/or the secondary storage. Such computer programs, when executed, enable the system 965 to perform various functions. The memory 940, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 965 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

Example Ray Tracing Pipeline

In at least one embodiment, the PPU 700 comprises a graphics processing unit (GPU). The PPU 700 may be configured to receive commands that specify shader programs for processing graphics data. Graphics data may be defined as a set of primitives such as points, lines, triangles, quads, triangle strips, and the like. A primitive may include data that specifies a number of vertices for the primitive (e.g., in a model-space coordinate system) as well as attributes associated with each vertex of the primitive. The PPU 700 may be configured to process the graphics primitives to generate a frame buffer (e.g., pixel data for each of the pixels of the display).

An application may write model data for a scene (e.g., a collection of vertices and attributes) to a memory such as a system memory or memory 704. The model data may define each of the objects that may be visible on a display. The application may then make an API call to the driver kernel that requests the model data to be rendered and displayed. The driver kernel may read the model data and write commands to the one or more streams to perform operations to process the model data. The commands may reference different shader programs to be implemented on the SMs 840 of the PPU 700. For example, different SMs 840 may be configured to execute different shader programs.

In at least one embodiment, the model data may be processed to perform one or more ray tracing operations, such as real-time tray tracing, to render the model data to a frame buffer. The contents of the frame buffer may be transmitted to a display controller for display on a display device. Ray tracing may refer to any of a variety of techniques for modeling or simulating light transport and/or other aspects of an environment, for example, for use in generating digital images or otherwise simulating the environment. Thus, while certain embodiments may be described with respect to light transport simulation, they may be applicable to simulating, modeling, and/or measuring any of a variety of aspects of an environment. Non-limiting examples of ray tracing include ray casting, recursive ray tracing, distribution ray tracing, photon mapping, and path tracing.

Ray tracing may be used to simulate a variety of optical effects-such as shadows, reflections, refractions, scattering phenomenon, ambient occlusions, global illuminations, or dispersion phenomenon (such as chromatic aberration). Ray tracing may involve generating ray-traced samples by casting rays in a virtual environment to sample lighting and/or other environmental conditions for pixels. The ray traced samples may be combined and used to determine pixel colors for an image. In at least one embodiment, to conserve computing resources, the lighting conditions may be sparsely sampled, resulting in noisy render data. Temporal accumulation may be used to increase the effective sample count by using information from previous frames. To produce a final render that approximates a render of a fully sampled scene, one or more denoising filters may by be applied to the noisy render data to reduce noise.

Many ray tracing algorithms may cast or shoot rays from a virtual camera, or eye, through a 2D viewing plane (e.g., a pixel plane) out into a 3D scene which may include one or more light sources. Some rays may directly reach the viewing plane from a light source, some may be blocked by an object in the scene causing shadows, and some may reflect or refract off an object before reaching the viewing plane. When the rays intersect objects, the color and lighting information at the points of intersection on object surfaces may contribute to various pixel color and illumination levels of pixels of the viewing plane. Different objects may have different surface properties that can cause them to reflect, refract, or absorb light in different ways, which may be accounted for in ray tracing. Rays may reflect off objects and hit other objects, or travel through the surfaces of transparent objects before reaching a light source, and the color and lighting information from all the intersected objects may contribute to the final pixel colors.

Figure 10:
FIG. 10 illustrates an example ray tracing pipeline suitable for use in implementing at least some embodiments of the present disclosure.

FIG. 10 illustrates an example ray tracing pipeline 1000 suitable for use in implementing at least some embodiments of the present disclosure. By way of example, and not limitations, the ray tracing pipeline 1000 may be implemented by the PPU 700 of FIG. 7, in accordance with at least one embodiment. The ray tracing pipeline 1000 may include processing steps implemented to generate 2D computer-generated images from 3D geometry data using one or more ray tracing techniques.

In at least one embodiment, the ray tracing pipeline 1000 may be constructed using one or more ray generation shaders 1002, one or more any hit shaders 1004, one or more intersection shaders 1006, one or more miss shaders 1008, and/or one or more closest hit shaders 1010.

The ray tracing pipeline 1000 may be implemented via an application executed by a host processor, such as a CPU. In at least one embodiment, a device driver may implement an application programming interface (API) that defines various functions that can be used by an application in order to generate graphical data for display. The device driver may refer to a software program that includes instructions that control the operation of the PPU 700, or other PPU used to implement the ray tracing pipeline 1000. The API may provide an abstraction for a programmer that lets a programmer use specialized graphics hardware, such as the PPU 700, to generate the graphical data without requiring the programmer to use the specific instruction set for the PPU 700. The application may include an API call that is routed to the device driver for the PPU 700. The device driver may interpret the API call and perform various operations to respond to the API call. In at least one embodiment, the device driver performs operations by executing instructions on the CPU. In at least one embodiment, the device driver performs operations, at least in part, by launching operations on the PPU 700 using an input/output interface between the CPU and the PPU 700. In at least one embodiment, the device driver is configured to implement the ray tracing pipeline 1000 using the hardware of the PPU 700.

Various programs may be executed within the PPU 700 in order to implement the various stages of the ray tracing pipeline 1000. For example, the device driver may launch a kernel on the PPU 700 to execute a stage implementing a ray generation shader 1002 on an SM 840 (or multiple SMs 840). The device driver (or the initial kernel executed by the PPU 700) may also launch other kernels on the PPU 700 to execute other stages of the ray tracing pipeline 1000.

The ray generation shader 1002 may be the first shader involved in ray tracing dispatch. The ray generation shader 1002 may call a High Level Shader Language (HLSL) function called TraceRay( ) This TraceRay( ) function may cast a single ray into the scene to search for intersections, which may trigger other shaders in the process. In at least one embodiment, the ray generation shader 1002 may call TraceRay( ) any number of times.

An any hit shader 1004 and an intersection shader 1006 may be invoked whenever TraceRay( ) finds a potential intersection between the ray and the scene. The intersection shader 1006 may determine whether the ray intersects an individual geometric primitive—for example a sphere, a subdivision surface, a triangle, or other form of primitive. Once an intersection is found, the any hit shader 1004 may be used to process the intersection further or potentially discard the intersection. An any hit shader 1004 may, by way of example and not limitation, use alpha testing by performing a texture lookup and deciding based on the texel's value whether or not to discard an intersection.

Once TraceRay( ) has completed the search for ray-scene intersections, either a miss shader 1008 or a closest hit shader 1010 may be invoked, depending on the outcome of the search. The closest hit shader 1010 may perform most shading operations, such as, material evaluation, texture lookups, and so on. The miss shader 1008 may be used to implement environment lookups, for example. In at least one embodiment, one or more of the closest hit shader 1010 or the miss shader 1008 may recursively trace rays by calling TraceRay( ) themselves.

The ray tracing pipeline 1000 constructed from any of the various shaders described herein may define a single-ray programming model. In at least one embodiment, each thread of the PPU 700, and/or other PPU used to implement the ray tracing pipeline 1000, may handle one ray at a time. In at least one embodiment, each thread cannot communicate with other threads or see other rays currently being processed. This may simplify shader code, while allowing for vendor-specific optimizations using the API.

In at least one embodiment, different shaders and/or shader types may communicate with each other using a ray payload. A ray payload may refer to a user-defined struct that's passed as an INOUT parameter to TraceRay( ) For example, an any hit shader 1004, a closest hit shader 1010, and/or a miss shader 1008 may read from and/or write to the ray payload, and therefore pass back the result of their computations to the caller of TraceRay( ).

In at least one embodiment, a ray generation shader 1002 may trace primary rays, which may include rays being sent into the scene originating from a virtual camera. However, ray generation shaders 1002 are not limited to this functionality. In at least one embodiment, a ray generation shader 1002 may base ray generation on rasterized g-buffer data (e.g., to trace reflections). Using this approach, ray tracing may be used to complement rasterization, rather than replace rasterization.

When using traditional rasterization, only the shaders required by the current object being drawn may have to be active on the PPU. This may allow rasterization pipeline objects to be relatively small, containing a single set of vertex shaders, pixel shaders, etc. In contrast, a ray tracing pipeline 1000 may be used to arbitrarily shoot rays into the scene. This may mean the rays could hit any object or many objects in the scene. Therefore, it may be the case that all shaders for all objects could potentially be hit and therefore it may be desirable for the shaders to all be resident on the PPU and ready for execution.

In at least one embodiment, a state object may be used to group shaders together for execution. At a high level, a state object of a ray tracing pipeline 1000 may be seen as a binary executable resulting from a link step across all the shaders compiled for the scene. The relationship between different shaders may be specified at state object creation. For example, triplets of intersection shaders 1006, any hit shaders 1004, and/or closest hit shaders 1010 may be bundled into hit groups. The application may specify the state object of the ray tracing pipeline 1000 to be executed when calling a DispatchRays( ) function on a command list. A Dispath-Rays( ) function may invoke a ray generation shader 1002 for each pixel for an image. In at least one embodiment, an application may create any number of state objects for a ray tracing pipeline 1000 and may re-use precompiled shaders for this purpose.

Figure 11:
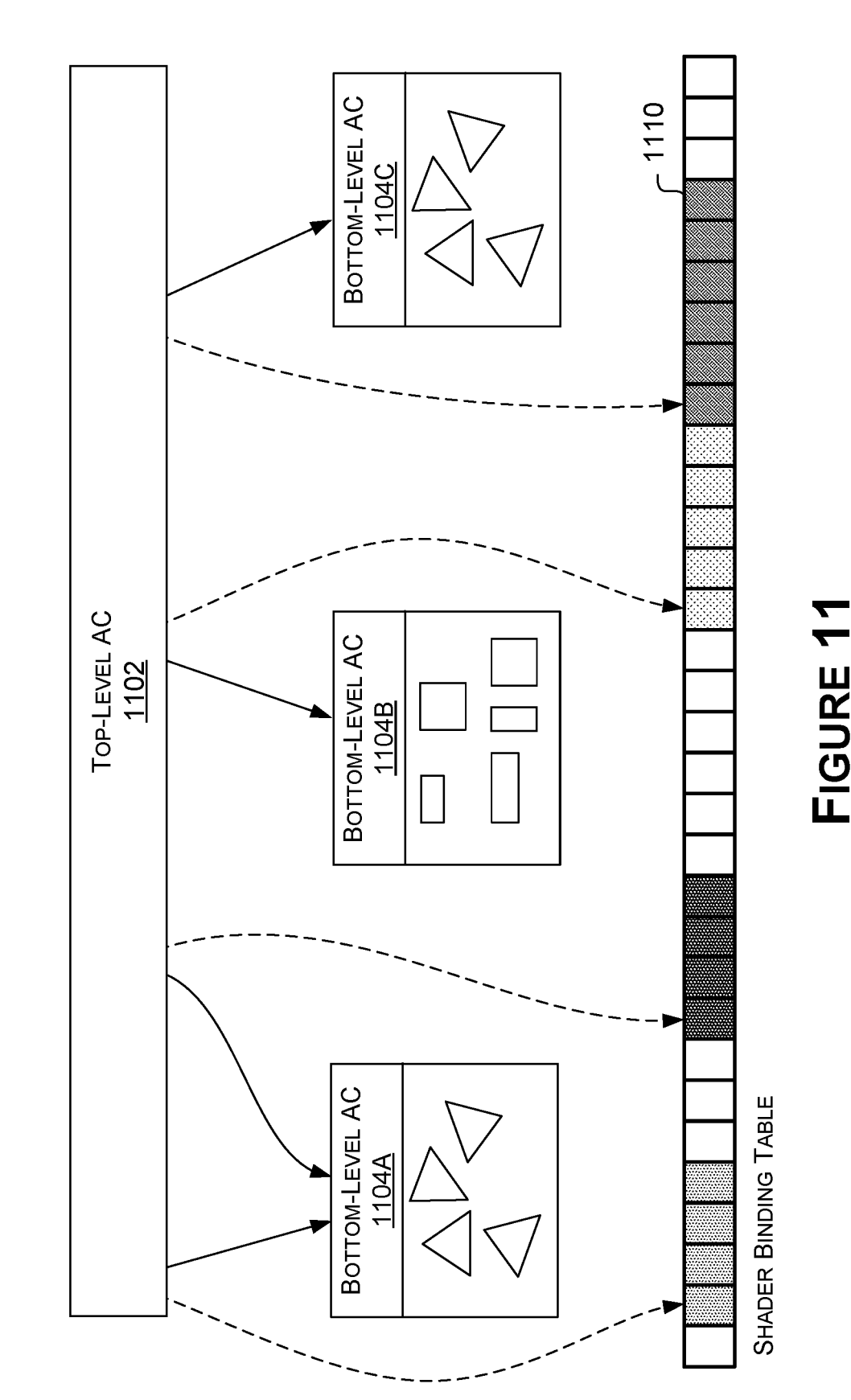
FIG. 11 illustrates an example acceleration structure suitable for use in implementing at least some embodiments of the present disclosure.

Referring now to FIG. 11, FIG. 11 illustrates an example acceleration structure 1100 suitable for use in implementing at least some embodiments of the present disclosure. The acceleration structure 1100 includes one or more top-level acceleration structures, such as a top-level acceleration structure 1102, and one or more bottom-level acceleration structures, such as bottom-level acceleration structures 1104A, 1104B, and 1104C.

The acceleration structure 1100 may comprise a spatial search data structure used in a ray tracing pipeline 1000 for acceleration structure traversal 1020 to efficiently compute intersections of rays with scene geometry. In at least one embodiment, the application may build an acceleration structure 1100 explicitly using a command list method BuildRaytracingAccelerationStructure( ). In at least one embodiment, the application may optimize an acceleration structure 1100 for different types of content, such as static versus animated content.

A top-level acceleration structure 1102 may be built from one or more references to one or more bottom-level acceleration structures 1104A, 1104B, and/or 1104C. These references may be referred to as instance descriptors. Each instance descriptor may include a transformation matrix to position the instance descriptor in the scene, and an offset into a shader table 1110(which may also be referred to as a "shader binding table") to locate material information. In at least one embodiment, a top-level acceleration structure 1102 may be used as a scene parameter provided to Trac-eRay( ) in a ray generation shader 1002, and may represent an entry point of the intersection search.

A ray tracing pipeline 1000 may specify the shaders that exist in a scene and an acceleration structure 1100 may specify geometry for the scene. The shader table 1110 may refer to a data structure used to tie the geometry to the shaders. For example, the shader table 1110 may define which shader is associated with which object in the scene. In addition, the shader table 1110 may hold information about the resources accessed by each shader, such as textures, buffers, and constants.

A shader table 1110 may comprise a chunk of PPU memory, which may be managed by the application. The application may be responsible for allocating the resource, filling the shader table 1110 with valid data, transferring it to the PPU, and correctly synchronizing the shader table 1110 with ray tracing dispatches. The application may also maintain multiple shader tables 1110, and, for example, multi-buffer them to update one copy while using another for rendering.

A shader table 1110 may comprise an array of equal-sized shader records. Each shader record may associate a shader (or a hit group) with a set of resources. In at least one embodiment, there may exist one record per geometry object in the scene, and a shader table 1110 may include thousands of entries or more.

Referring now to FIG. 12, FIG. 12 illustrates an example shader record 1200 suitable for use in implementing at least some embodiments of the present disclosure. The shader record 1200 is an example of a shader record that may be included in the shader table 1110 of FIG. 11. The shader record 1200 includes a shader identifier 1202 and a root table 1204.

In at least one embodiment, the shader identifier 1202 may be represented in a beginning portion of the shader record 1200 in memory. The shader identifier 1202 may be an opaque identifier, which the application obtains by querying for the shader identifier 1202 from a compiled shader. The root table 1204 may contain the shader's resources. The layout of the root table 1204 may be defined by the shader's local root signature. The root signature may contain any combination of constants, descriptor tables, and root descriptors. For ray tracing, the application may directly access the root table 1204 in memory (e.g., rather than using "setter" methods), which may allow for efficient updates. In at least one embodiment, a shader table 1110 may be updated from a PPU shader.

As described herein, shader table offsets may be used when building a top-level acceleration structure 1102 from instance descriptors. The system may use these offsets to locate the correct shader record 1200 whenever TraceRay( ) finds an intersection. The system may then bind the resources defined in the shader record 1200 and execute the appropriate shader for the intersected geometry.

Example Computing Device

Figure 13:
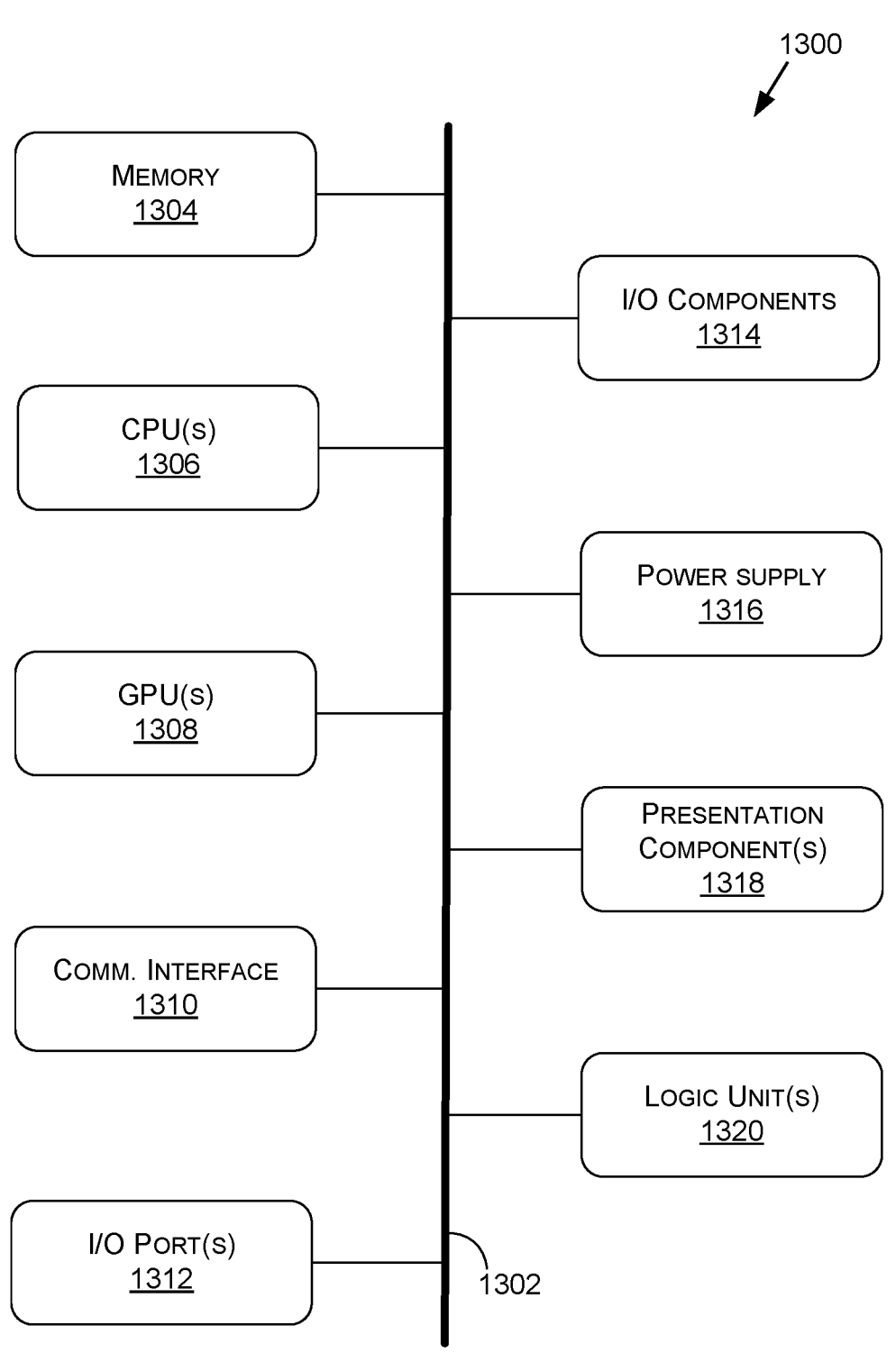
FIG. 13 is a block diagram of an example computing device suitable for use in implementing some embodiments of the present disclosure.

FIG. 13 is a block diagram of an example computing device(s) 1300 suitable for use in implementing at least some embodiments of the present disclosure. Computing device 1300 may include an interconnect system 1302 that directly or indirectly couples the following devices: memory 1304, one or more central processing units (CPUs) 1306, one or more graphics processing units (GPUs) 1308, a communication interface 1310, input/output (I/O) ports 1312, input/output components 1314, a power supply 1316, one or more presentation components 1318 (e.g., display(s)), and one or more logic units 1320. In at least one embodiment, the computing device(s) 1300 may comprise one or more virtual machines (VMs), and/or any of the components thereof may comprise virtual components (e.g., virtual hardware components). For non-limiting examples, one or more of the GPUs 1308 may comprise one or more pups, one or more of the CPUs 1306 may comprise one or more vCPUs, and/or one or more of the logic units 1320 may comprise one or more virtual logic units. As such, a computing device(s) 1300 may include discrete components (e.g., a full GPU dedicated to the computing device 1300), virtual components (e.g., a portion of a GPU dedicated to the computing device 1300), or a combination thereof.

Although the various blocks of FIG. 13 are shown as connected via the interconnect system 1302 with lines, this is not intended to be limiting and is for clarity only. For example, in some embodiments, a presentation component 1318, such as a display device, may be considered an I/O component 1314 (e.g., if the display is a touch screen). As another example, the CPUs 1306 and/or GPUs 1308 may include memory (e.g., the memory 1304 may be representative of a storage device in addition to the memory of the GPUs 1308, the CPUs 1306, and/or other components). In other words, the computing device of FIG. 13 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 13.

The interconnect system 1302 may represent one or more links or busses, such as an address bus, a data bus, a control bus, or a combination thereof. The interconnect system 1302 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1306 may be directly connected to the memory 1304. Further, the CPU 1306 may be directly connected to the GPU 1308. Where there is direct, or point-to-point connection between components, the interconnect system 1302 may include a PCIe link to carry out the connection. In these examples, a PCI bus need not be included in the computing device 1300.

The memory 1304 may include any of a variety of computer-readable media. The computer-readable media may be any available media that may be accessed by the computing device 1300. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1304 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1300. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1306 may be configured to execute at least some of the computer-readable instructions to control one or more components of the computing device 1300 to perform one or more of the methods and/or processes described herein. The CPU(s) 1306 may each include one or more cores (e.g., one, two, four, eight, twenty-eight, seventy-two, etc.) that are capable of handling a multitude of software threads simultaneously. The CPU(s) 1306 may include any type of processor, and may include different types of processors depending on the type of computing device 1300 implemented (e.g., processors with fewer cores for mobile devices and processors with more cores for servers). For example, depending on the type of computing device 1300, the processor may be an Advanced RISC Machines (ARM) processor implemented using Reduced Instruction Set Computing (RISC) or an x86 processor implemented using Complex Instruction Set Computing (CISC). The computing device 1300 may include one or more CPUs 1306 in addition to one or more microprocessors or supplementary co-processors, such as math co-processors.

In addition to or alternatively from the CPU(s) 1306, the GPU(s) 1308 may be configured to execute at least some of the computer-readable instructions to control one or more components of the computing device 1300 to perform one or more of the methods and/or processes described herein. One or more of the GPU(s) 1308 may be an integrated GPU (e.g., with one or more of the CPU(s) 1306 and/or one or more of the GPU(s) 1308 may be a discrete GPU. In embodiments, one or more of the GPU(s) 1308 may be a coprocessor of one or more of the CPU(s) 1306. The GPU(s) 1308 may be used by the computing device 1300 to render graphics (e.g., 3D graphics) or perform general purpose computations. For example, the GPU(s) 1308 may be used for General-Purpose computing on GPUs (GPGPU). The GPU(s) 1308 may include hundreds or thousands of cores that are capable of handling hundreds or thousands of software threads simultaneously. The GPU(s) 1308 may generate pixel data for output images in response to rendering commands (e.g., rendering commands from the CPU(s) 1306 received via a host interface). The GPU(s) 1308 may include graphics memory, such as display memory, for storing pixel data or any other suitable data, such as GPGPU data. The display memory may be included as part of the memory 1304. The GPU(s) 1308 may include two or more GPUs operating in parallel (e.g., via a link). The link may directly connect the GPUs (e.g., using NVLINK) or may connect the GPUs through a switch (e.g., using NVSwitch). When combined together, each GPU 1308 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1306 and/or the GPU(s) 1308, the logic unit(s) 1320 may be configured to execute at least some of the computer-readable instructions to control one or more components of the computing device 1300 to perform one or more of the methods and/or processes described herein. In embodiments, the CPU(s) 1306, the GPU(s) 1308, and/or the logic unit(s) 1320 may discretely or jointly perform any combination of the methods, processes and/or portions thereof. One or more of the logic units 1320 may be part of and/or integrated in one or more of the CPU(s) 1306 and/or the GPU(s) 1308 and/or one or more of the logic units 1320 may be discrete components or otherwise external to the CPU(s) 1306 and/or the GPU(s) 1308. In embodiments, one or more of the logic units 1320 may be a coprocessor of one or more of the CPU(s) 1306 and/or one or more of the GPU(s) 1308.

Examples of the logic unit(s) 1320 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1310 may include one or more receivers, transmitters, and/or transceivers that enable the computing device 1300 to communicate with other computing devices via an electronic communication network, included wired and/or wireless communications. The communication interface 1310 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1320 and/or communication interface 1310 may include one or more data processing units (DPUs) to transmit data received over a network and/or through interconnect system 1302 directly to (e.g., a memory of) one or more GPU(s) 1308.

The I/O ports 1312 may enable the computing device 1300 to be logically coupled to other devices including the I/O components 1314, the presentation component(s) 1318, and/or other components, some of which may be built in to (e.g., integrated in) the computing device 1300. Illustrative I/O components 1314 include a microphone, mouse, keyboard, joystick, game pad, game controller, satellite dish, scanner, printer, wireless device, etc. The I/O components 1314 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be include depth cameras, such as stereoscopic camera systems, infrared camera systems, RGB camera systems, touchscreen technology, and combinations of these, for gesture detection and recognition. Additionally, the computing device 1300 may include accelerometers or gyroscopes (e.g., as part of an inertia measurement unit (IMU)) that enable detection of motion. In some examples, the output of the accelerometers or gyroscopes may be used by the computing device 1300 to render immersive augmented reality or virtual reality.

The power supply 1316 may include a hard-wired power supply, a battery power supply, or a combination thereof. The power supply 1316 may provide power to the computing device 1300 to enable the components of the computing device 1300 to operate.

The presentation component(s) 1318 may include a display (e.g., a monitor, a touch screen, a television screen, a heads-up-display (HUD), other display types, or a combination thereof), speakers, and/or other presentation components. The presentation component(s) 1318 may receive data from other components (e.g., the GPU(s) 1308, the CPU(s) 1306, DPUs, etc.), and output the data (e.g., as an image, video, sound, etc.).

Example Data Center

Figure 14:
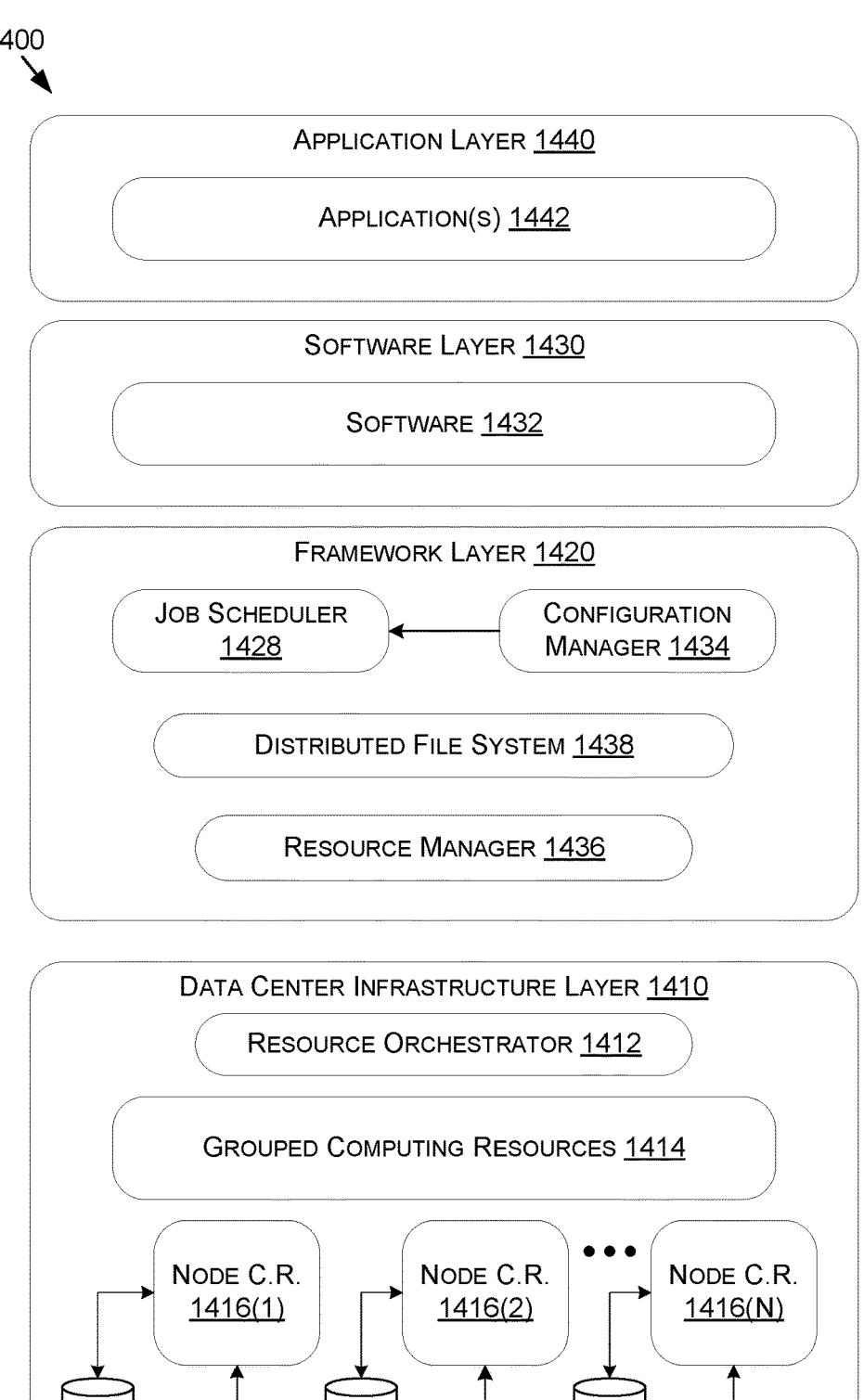
FIG. 14 is a block diagram of an example data center suitable for use in implementing some embodiments of the present disclosure.

FIG. 14 illustrates an example data center 1400 that may be used in at least one embodiments of the present disclosure. The data center 1400 may include a data center infrastructure layer 1410, a framework layer 1420, a software layer 1430, and/or an application layer 1440.

As shown in FIG. 14, the data center infrastructure layer 1410 may include a resource orchestrator 1412, grouped computing resources 1414, and node computing resources ("node C.R.s") 1416(1)-1416(N), where "N" represents any whole, positive integer. In at least one embodiment, node C.R.s 1416(1)-1416(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1416(1)-1416(N) may correspond to a server having one or more of the above-mentioned computing resources. In addition, in some embodiments, the node C.R.s 1416(1)-14161(N) may include one or more virtual components, such as vGPUs, vCPUs, and/or the like, and/or one or more of the node C.R.s 1416(1)-1416(N) may correspond to a virtual machine (VM).

In at least one embodiment, grouped computing resources 1414 may include separate groupings of node C.R.s 1416 housed within one or more racks (not shown), or many racks housed in data centers at various geographical locations (also not shown). Separate groupings of node C.R.s 1416 within grouped computing resources 1414 may include grouped compute, network, memory or storage resources that may be configured or allocated to support one or more workloads. In at least one embodiment, several node C.R.s 1416 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1412 may configure or otherwise control one or more node C.R.s 1416(1)-1416(N) and/or grouped computing resources 1414. In at least one embodiment, resource orchestrator 1412 may include a software design infrastructure (SDI) management entity for the data center 1400. The resource orchestrator 1412 may include hardware, software, or some combination thereof.

In at least one embodiment, as shown in FIG. 14, framework layer 1420 may include a job scheduler 1428, a configuration manager 1434, a resource manager 1436, and/or a distributed file system 1438. The framework layer 1420 may include a framework to support software 1432 of software layer 1430 and/or one or more application(s) 1442 of application layer 1440. The software 1432 or application(s) 1442 may respectively include web-based service software or applications, such as those provided by Amazon Web Services, Google Cloud and Microsoft Azure. The framework layer 1420 may be, but is not limited to, a type of free and open-source software web application framework such as Apache Spark™ (hereinafter "Spark") that may utilize distributed file system 1438 for large-scale data processing (e.g., "big data"). In at least one embodiment, job scheduler 1428 may include a Spark driver to facilitate scheduling of workloads supported by various layers of data center 1400. The configuration manager 1434 may be capable of configuring different layers such as software layer 1430 and framework layer 1420 including Spark and distributed file system 1438 for supporting large-scale data processing. The resource manager 1436 may be capable of managing clustered or grouped computing resources mapped to or allocated for support of distributed file system 1438 and job scheduler 1428. In at least one embodiment, clustered or grouped computing resources may include grouped computing resource 1414 at data center infrastructure layer 1410. The resource manager 1436 may coordinate with resource orchestrator 1412 to manage these mapped or allocated computing resources.

In at least one embodiment, software 1432 included in software layer 1430 may include software used by at least portions of node C.R.s 1416(1)-1416(N), grouped computing resources 1414, and/or distributed file system 1438 of framework layer 1420. One or more types of software may include, but are not limited to, Internet web page search software, e-mail virus scan software, database software, and streaming video content software.

In at least one embodiment, application(s) 1442 included in application layer 1440 may include one or more types of applications used by at least portions of node C.R.s 1416(1)-1416(N), grouped computing resources 1414, and/or distributed file system 1438 of framework layer 1420. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1434, resource manager 1436, and resource orchestrator 1412 may implement any number and type of self-modifying actions based on any amount and type of data acquired in any technically feasible fashion. Self-modifying actions may relieve a data center operator of data center 1400 from making possibly bad configuration decisions and possibly avoiding underused and/or poor performing portions of a data center.

The data center 1400 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1400. In at least one embodiment, trained or deployed machine learning models corresponding to one or more neural networks may be used to infer or predict information using resources described above with respect to the data center 1400 by using weight parameters calculated through one or more training techniques, such as but not limited to those described herein.

In at least one embodiment, the data center 1400 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1300 of FIG. 13—e.g., each device may include similar components, features, and/or functionality of the computing device(s) 1300. In addition, where backend devices (e.g., servers, NAS, etc.) are implemented, the backend devices may be included as part of a data center 1400, an example of which is described in more detail herein with respect to FIG. 14.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1300 described herein with respect to FIG. 13. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Paragraphs

A. A method comprising: applying, to one or more machine learning models (MLMs), image data capturing one or more views of an object; determining, based at least on the applying, one or more predictions indicating one or more characteristics of one or more portions of a three-dimensional (3D) representation of the object; generating, using the one or more predictions and based at least on the one or more characteristics, one or more surfaces corresponding to the one or more portions of the 3D representation of the object; casting one or more rays into a scene to determine one or more intersections between the one or more rays and the one or more surfaces; generating one or more samples of the 3D representation of the object using one or more locations in the scene that correspond to the one or more intersections; and rendering, using the one or more samples, one or more images of the object.

B. The method as recited in paragraph A, wherein the one or more locations include at least a first location where a ray of the one or more rays intersects a first surface of the one or more surfaces and a second location where the ray intersects a second surface of the one or more surfaces, the method further comprising: determining a number of samples to generate along the ray based at least on a distance between the first location and the second location; and generating the number of samples of the 3D representation along the ray between the first location and the second location.

C. The method as recited in any one of paragraphs A-B, wherein a first number of samples of the one or more samples is greater along a first ray intersecting a first location in the scene corresponding to a first portion of the 3D representation than a second number of samples of the one or more samples along a second ray intersecting a second location of the one or more locations in the scene corresponding to a second portion of the 3D representation.

D. The method as recited in any one of paragraphs A-C, wherein the first portion corresponds to a first characteristic of the one or more characteristics and the second portion corresponds to a second characteristic of the one or more characteristics that is different from the first characteristic.

E. The method as recited in any one of paragraphs A-D, wherein the one or more surfaces comprise one or more meshes corresponding to the one or more portions of the 3D representation of the object, the one or more meshes including at least a first mesh corresponding to an inner boundary associated with the 3D representation of the object and a second mesh corresponding to an outer boundary associated with the 3D representation of the object.

F. The method as recited in any one of paragraphs A-E, wherein: the one or more surfaces includes at least a first surface and a second surface, the one or more portions includes at least a first portion and a second portion, and a distance between the first surface and the second surface varies between the first portion and the second portion based at least on a variation in the one or more predictions between the first portion and the second portion.

G. The method as recited in any one of paragraphs A-F, wherein: the one or more surfaces includes at least a first surface and a second surface, the one or more portions includes at least a first portion and a second portion, a first distance between the first surface and the second surface at the first portion is related to a first characteristic of the one or more characteristics, and a second distance between the first surface and the second surface at the second portion is related to a second characteristic of the one or more characteristics.

H. The method as recited in any one of paragraphs A-G, wherein the one or more characteristics correspond to at least one of one or more surface compositions of the object or one or more volumetric features of the object.

I. The method as recited in any one of paragraphs A-H, wherein the one or more predictions are represented by one or more sizes of a kernel in the 3D representation, the one or more sizes of the kernel indicating the one or more characteristics.

J. A system comprising: one or more processors to: determine, using one or more machine learning models (MLMs) and based at least on image data representing one or more views of an object, one or more predictions indicating one or more characteristics of one or more portions of a three-dimensional (3D) representation of the object; determine, using the one or more predictions and based at least on the one or more characteristics, one or more locations in a scene that correspond to the one or more portions of the 3D representation of the object; determine one or more samples of the 3D representation of the object that correspond to the one or more locations; and render one or more images of the object using the one or more samples.

K. The system as recited in paragraph J, wherein the one or more locations include at least a first location corresponding to a first portion of the 3D representation and a second location corresponding to a second portion of the 3D representation, the one or more processors further to: determine, based at least on a distance between the first location and the second location, a number of samples to use between the first location and the second location; and obtain the number of the samples of the 3D representation between the first location and the second location.

L. The system as recited in any one of paragraphs J-K, wherein the one or more processors are further to cast one or more rays into a scene including the 3D representation of the object, wherein the determination of the one or more locations is based at least on the casting of the one or more rays.

M. The system as recited in any one of paragraphs J-L, wherein the one or more locations correspond to one or more intersections between the one or more rays and the one or more portions of the 3D representation of the object.

N. The system as recited in any one of paragraphs J-M, wherein: the one or more locations includes at least a first location and a second location, the one or more samples includes at least a one or more first samples corresponding to the first location and one or more second samples corresponding to the second location, and a first number of the one or more first samples is greater than a second number of the one or more second samples.

O. The system as recited in any one of paragraphs J-N, wherein the one or more processors are further to determine, using the one or more predictions and based at least on the one or more characteristics, one or more surfaces corresponding to the one or more portions of the 3D representation of the object, the one or more surfaces including at least a first surface and a second surface, wherein a distance between the first surface and the second surface varies between the one or more portions based at least on the one or more characteristics.

P. The system as recited in any one of paragraphs J-O, wherein the one or more characteristics correspond to at least one of one or more surface compositions of the object or one or more volumetric features of the object.

Q. The system as recited in any one of paragraphs J-P, wherein: the one or more MLMs are to generate, based at least on the image data, data indicating the 3D representation of the object, and the one or more samples is of the data indicating the 3D representation of the object.

R. The system as recited in any one of paragraphs J-Q, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using a large language model; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

S. At least one processor comprising: one or more circuits to render one or more images of an object, the one or more images rendered using one or more samples of a three-dimensional (3D) representation of the object, the 3D representation of the object including one or more surfaces having one or more characteristics indicative of a number of the one or more samples to be obtained from one or more portions of the 3D representation of the object to render the one or more images.

T. The at least one processor as recited in paragraph S, wherein the processor is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using a large language model; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

What is claimed is:

1. A method comprising:
applying, to one or more machine learning models (MLMs), image data capturing one or more views of an object;
determining, based at least on the applying, one or more predictions indicating one or more characteristics of one or more portions of a three-dimensional (3D) representation of the object;
generating, using the one or more predictions and based at least on the one or more characteristics, a pair of surfaces including a first surface defining an inner boundary associated with the 3D representation of the object and a second surface defining an outer boundary associated with the 3D representation of the object;
casting one or more rays into a scene that includes the 3D representation of the object to determine one or more intersections between the one or more rays and the pair of surfaces;
generating one or more samples of the 3D representation of the object using one or more locations in the scene that correspond to the one or more intersections; and
rendering, using the one or more samples, one or more images of the object.

2. The method of claim 1, wherein the one or more locations include at least a first location where a ray of the one or more rays intersects the first surface and a second location where the ray intersects the second surface, the method further comprising:
determining a number of samples to generate along the ray based at least on a distance between the first location and the second location; and
generating the number of samples of the 3D representation along the ray between the first location and the second location.

3. The method of claim 1, wherein a first number of samples of the one or more samples is greater along a first ray intersecting a first location in the scene corresponding to a first portion of the 3D representation than a second number of samples of the one or more samples along a second ray intersecting a second location of the one or more locations in the scene corresponding to a second portion of the 3D representation.

4. The method of claim 3, wherein the first portion corresponds to a first characteristic of the one or more characteristics and the second portion corresponds to a second characteristic of the one or more characteristics that is different from the first characteristic.

5. The method of claim 1, wherein the pair of surfaces is a pair of meshes including at least a first mesh corresponding to the inner boundary associated with the 3D representation of the object and a second mesh corresponding to the outer boundary associated with the 3D representation of the object.

6. The method of claim 1, wherein:
the one or more portions includes at least a first portion and a second portion, and
a distance between the first surface and the second surface varies between the first portion and the second portion based at least on a variation in the one or more predictions between the first portion and the second portion.

7. The method of claim 1, wherein:
the one or more portions includes at least a first portion and a second portion, a first distance between the first surface and the second surface at the first portion is related to a first characteristic of the one or more characteristics, and a second distance between the first surface and the second surface at the second portion is related to a second characteristic of the one or more characteristics.

8. The method of claim 1, wherein the one or more characteristics correspond to at least one of one or more surface compositions of the object or one or more volumetric features of the object.

9. The method of claim 1, wherein the one or more predictions are represented by one or more sizes of a kernel in the 3D representation, the one or more sizes of the kernel indicating the one or more characteristics.

10. A system comprising:

one or more processors to:

determine, using one or more machine learning models (MLMs) and based at least on image data representing one or more views of an object, one or more predictions indicating one or more characteristics of one or more portions of a three-dimensional (3D) representation of the object;

generate, using the one or more predictions and based at least on the one or more characteristics, a pair of surfaces defining a boundary region associated with the 3D representation of the object;

obtain one or more samples of the 3D representation of the object based at least on one or more intersections between one or more rays and one or more locations disposed within the boundary region; and render one or more images of the object using the one or more samples.

11. The system of claim 10, wherein the one or more processors are further to cast the one or more rays into a scene including the pair of surfaces, wherein the obtaining of the one or more samples is based at least on the casting of the one or more rays.

12. The system of claim 10, wherein:

the one or more locations includes at least a first location and a second location within the boundary region, the one or more samples include one or more first samples corresponding to the first location and one or more second samples corresponding to the second location, and a first number of the one or more first samples is greater than a second number of the one or more second samples based at least on a thickness of the boundary region being greater at the first location than at the second location.

13. The system of claim 10, wherein a distance between the pair of surfaces varies between the one or more portions of the 3D representation based at least on the one or more characteristics.

14. The system of claim 10, wherein the one or more characteristics correspond to at least one of one or more surface compositions of the object or one or more volumetric features of the object.

15. The system of claim 10, wherein:

the one or more MLMs are to generate, based at least on the image data, data indicating the 3D representation of the object, and the one or more samples is of the data indicating the 3D representation of the object.

16. The system of claim 10, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using a large language model;

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

17. The system of claim 10, the one or more processors further to:

apply a surface-based rendering technique at a first location within the boundary region based at least on a thickness of the boundary region being less than a threshold at the first location; and apply a volumetric rendering technique at a second location within the boundary region based at least on the thickness of the boundary region being greater than the threshold at the second location.

18. The system of claim 10, wherein the boundary region defined by the pair of surfaces corresponds to an acceleration structure for ray traversal during the rendering of the one or more images.

19. At least one processor comprising:

one or more circuits to render one or more images of an object, the one or more images rendered using one or more samples of a three-dimensional (3D) representation of the object, the 3D representation of the object including a pair of surfaces defining a boundary region of the object, the boundary region having a varying thickness that is indicative of a number of samples to be obtained from locations within the boundary region to render the one or more images.

20. The processor of claim 19, wherein the processor is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

US 12,682,549 B2

43 a system implemented using an edge device;

a system implemented using a robot;

a system for performing one or more generative AI operations;

a system for performing operations using a large language model;

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

* * * * *

44